(12) United States Patent
Matsuo et al.

(10) Patent No.: US 7,788,104 B2
(45) Date of Patent: Aug. 31, 2010

(54) INFORMATION PROCESSING TERMINAL FOR NOTIFICATION OF EMOTION

(75) Inventors: Hideaki Matsuo, Kanagawa (JP); Takaaki Nishi, Kanagawa (JP); Tomoko Obama, Kanagawa (JP); Yasuki Yamakawa, Kanagawa (JP); Tetsurou Sugimoto, Tokyo (JP)

(73) Assignee: Panasonic Corporation, Osaka (JP)

( * ) Notice: Subject to any disclaimer, the term of this patent is extended or adjusted under 35 U.S.C. 154(b) by 719 days.

(21) Appl. No.: 11/574,899

(22) PCT Filed: Sep. 9, 2005

(86) PCT No.: PCT/JP2005/016658

§ 371 (c)(1),
(2), (4) Date: Mar. 8, 2007

(87) PCT Pub. No.: WO2006/028223

PCT Pub. Date: Mar. 16, 2006

(65) Prior Publication Data

US 2008/0059158 A1 Mar. 6, 2008

(30) Foreign Application Priority Data

Sep. 10, 2004 (JP) .............................. 2004-264350

(51) Int. Cl.
*G10L 21/06* (2006.01)
*G10L 21/00* (2006.01)
*G10L 15/26* (2006.01)
*H04M 11/00* (2006.01)

(52) U.S. Cl. ........................ 704/276; 704/235; 704/270; 379/88.14

(58) Field of Classification Search ................... None
See application file for complete search history.

(56) References Cited

U.S. PATENT DOCUMENTS 5,987,415 A * 11/1999 Breese et al. ............... 704/270

(Continued)

FOREIGN PATENT DOCUMENTS

JP 2002-298155 10/2002

(Continued)

OTHER PUBLICATIONS

Extended European Search Report dated May 4, 2010.

*Primary Examiner*—Matthew J Sked
(74) *Attorney, Agent, or Firm*—Pearne & Gordon LLP

(57) ABSTRACT

The present invention is to provide an information processing terminal which can use another expression means to indicate undesirable emotions directly transmitted to a party by a method of directly expressing talking person's emotions in real time, so that the whole image of a calling status can be reviewed afterward and grasped.

An information processing terminal 1 including: a voice signal output portion 102 for inputting a voice; an emotion estimation portion 201 for generating parameters of emotions from the inputted voice; and a notification portion 30, 40, 50 for giving notice of various kinds of information, wherein the information processing terminal 1 further includes an emotion specifying portion 203 for specifying an emotion expressed by a distinctive parameter of the generated parameters, and the notification portion 30, 40, 50 gives notice of the specified emotion.

22 Claims, 26 Drawing Sheets

U.S. PATENT DOCUMENTS

| | | | |
|---|---|---|---|
| 6,638,217 B1 * | 10/2003 | Liberman | 600/300 |
| 7,222,075 B2 * | 5/2007 | Petrushin | 704/270 |
| 7,251,606 B2 * | 7/2007 | Horinaka et al. | 704/272 |
| 7,451,079 B2 * | 11/2008 | Oudeyer | 704/205 |
| 2002/0007276 A1 * | 1/2002 | Rosenblatt et al. | 704/260 |
| 2004/0147814 A1 | 7/2004 | Zancho et al. | |

FOREIGN PATENT DOCUMENTS

| | | |
|---|---|---|
| WO | 00/62279 | 10/2000 |
| WO | 03/021924 A1 | 3/2003 |

* cited by examiner

FIG. 21

| CALLING TIME DIVISION ZONE SEQUENCE | 1 | | 2 | | | | | 3 | | 4 | | TOTAL ACCUMULATED CALLING TIME |
|---|---|---|---|---|---|---|---|---|---|---|---|---|
| UNIT TIME SERIES / EMOTION KIND | 1 | 2 | 3 | 4 | 5 | 6 | 7 | 8 | 9 | 10 | 11 | |
| LOVE | 80 | 20 | 20 | 60 | 80 | 50 | 20 | 30 | 50 | 20 | 80 | 510 |
| HAPPINESS /EXCITEMENT | 30 | 20 | 60 | 40 | 50 | 20 | 20 | 20 | 20 | 50 | 20 | 350 |
| ANGER | 20 | 20 | 40 | 40 | 50 | 20 | 0 | 10 | 30 | 20 | 20 | 270 |
| SADNESS | 10 | 10 | 50 | 50 | 20 | 20 | 0 | 10 | 20 | 30 | 20 | 240 |
| NEUTRAL | 50 | 60 | 20 | 20 | 20 | 30 | 50 | 10 | 10 | 10 | 10 | 290 |
| EMOTION JUDGMENT | LOVE | NEUTRAL | HAPPINESS /EXCITEMENT | LOVE | LOVE | LOVE | LOVE NEUTRAL | NO JUDGEMENT | LOVE | HAPPINESS /EXCITEMENT | LOVE | LOVE |

FIG. 22

| CALLING TIME DIVISION ZONE SEQUENCE / EMOTION KIND | 1 | 2 | 3 | 4 | TOTAL ACCUMULATED CALLING TIME |
|---|---|---|---|---|---|
| LOVE | 120 | 190 | 100 | 100 | 510 |
| HAPPINESS /EXCITEMENT | 110 | 110 | 60 | 70 | 350 |
| ANGER | 80 | 110 | 40 | 40 | 270 |
| SADNESS | 70 | 90 | 30 | 50 | 240 |
| NEUTRAL | 130 | 70 | 70 | 20 | 290 |
| EMOTION JUDGMENT | LOVE | LOVE | NEUTRAL | LOVE | LOVE |

FIG. 23

| EMOTION | ICON |
| --- | --- |
| NEUTRAL | 😐 |
| HAPPINESS/ EXCITEMENT | 😀 |
| ANGER | 😠 |
| SURPRISE | 😮 |
| SADNESS | 😢 |

FIG. 24

| EMOTION | LED EMISSION COLOR |
| --- | --- |
| NEUTRAL | LIGHT BLUE |
| HAPPINESS/ EXCITEMENT | PINK |
| ANGER | RED |
| SURPRISE | YELLOW |
| SADNESS | BLUE |

FIG. 25

| EMOTION INTENSITY | LED EMISSION PATTERN |
| --- | --- |
| STRONG | rapid ON/OFF pulses vs TIME |
| NORMAL | slow ON/OFF pulse vs TIME |
| WEAK | constant ON vs TIME |

351 ONE CALLING RESULT DISPLAY ITEM

ANIMATION 310

361 ONE CALLING RESULT DISPLAY ITEM

FIG. 34
(A)
(B)

INFORMATION PROCESSING TERMINAL FOR NOTIFICATION OF EMOTION

TECHNICAL FIELD

The present invention relates to an information processing terminal for notification of a talking person's emotion inferred from the person's voice.

BACKGROUND ART

There has been disclosed a technique for inferring a person's emotion from the person's voice, specifically from the volume of the voice, the waveform of the volume, the pitch of the voice, the phonetic of the voice, etc. (Patent Document 1). In addition, there has been disclosed another technique for expressing a human's emotion by three-dimensionally changing and displaying expression of a simulated model of a human's face created on 3D computer graphics on the basis of the emotion inferred by the technique according to Patent Document 1 or the like (Patent Document 2). By these techniques, a talking person's emotion can be read visually from only the person's voice.

Patent Document 1: WO 00/62279

Patent Document 2: JP-A-2002-298155

DISCLOSURE OF THE INVENTION

Problems that the Invention is to Solve

When a certain voice is estimated to contain a plurality of emotions, for example, six factors, i.e. delight, sorrow, surprise, hatred, anger and fear, are often used as primary factors of emotion information. There has been however a problem that emotions unsuitable for expression on communications are also transmitted directly to a party if results of emotions are real-time expressed as they are.

If a voice call is made by phone, only a record of a calling time point remains but the status of the conversation at that time like a mail does not remain. There has been heretofore a problem that there is no way to look back to the calling status at that time.

The invention has been developed under such circumstances. An object of the invention is to provide an information processing terminal in which undesirable emotions directly transmitted to a party by a method of directly expressing talking person's emotions in real time can be indicated by another expression means.

Another object of the invention is to provide an information processing terminal in which the whole image of a calling status can be grasped while looked back to.

Means for Solving the Problems

The information processing terminal according to the invention is an information processing terminal including: a parameter generation unit for generating parameters of emotions from the inputted voice; and a notification unit for giving notice of various kinds of information, wherein the notification unit gives notice of information concerned with emotions corresponding to the parameters generated by the parameter generation unit.

The information processing terminal according to the invention further includes a storage unit for storing data, wherein: the storage unit stores the parameters of emotions generated by the parameter generation unit; and the notification unit gives notice of information concerned with emotions corresponding to the parameters stored in the storage unit.

According to this configuration, notice of a talking person's emotion can be given on the basis of the person's inputted voice to thereby prevent the talking person's emotion from being misread as another emotion.

In the information processing terminal according to the invention, the storage unit stores the parameters of emotions generated by the parameter generation unit, correspondingly to a sequence in which the parameters of emotions are generated by the parameter generation unit; and the notification unit gives notice of information concerned with emotions corresponding to the parameters stored in the storage unit, in accordance with the sequence.

According to this configuration, talking person's emotions can be read in time series, so that the talking person's emotions can be grasped more easily.

The information processing terminal according to the invention further includes a call unit for making a telephone call, wherein the voice input unit inputs voice during a telephone call made by the call unit.

According to this configuration, voice during a telephone call can be inputted, so that the voice can be inputted to the information processing terminal easily.

The information processing terminal according to the invention further includes: a storage unit for storing data; and a call unit for making a telephone call, wherein: the voice input unit inputs voice during a telephone call made by the call unit; the storage unit stores the parameters of emotions generated by the parameter generation unit, correspondingly to a sequence in which the parameters of emotions are generated by the parameter generation unit; and the notification unit gives notice of information concerned with emotions corresponding to the parameters stored in the storage unit, in accordance with the sequence.

According to this configuration, talking party's emotions can be read in time series, so that the talking party's emotions can be grasped easily. As a result, smooth communication can be achieved.

In the information processing terminal according to the invention, the notification unit gives notice of information concerned with the emotions after completion of the telephone call made by the call unit.

According to this configuration, talking party's emotions or user's own emotions during a telephone call can be checked after completion of the telephone call, so that smooth communication can be achieved.

In the information processing terminal according to the invention, the notification unit includes a display unit for displaying various kinds of information; the storage unit stores the parameters of emotions in accordance with each telephone call made by the call unit; and when the display unit displays a call history, the display unit gives notice of information concerned with emotions corresponding to the parameters stored in the storage unit, in accordance with each call item in the call history.

According to this configuration, talking party's emotions or user's own emotions in each telephone call can be displayed in an item of a call history, so that contents of a conversation made in each telephone call can be remembered easily.

In the information processing terminal according to the invention, the notification unit includes a display unit for displaying various kinds of information; the storage unit stores the parameters of emotions in accordance with each telephone call made by the call unit; and the display unit displays information concerned with an emotion corresponding to a specific parameter among emotions corresponding to the parameters stored in the storage unit, along time series.

According to this configuration, talking party's emotions or user's own emotions in each telephone call can be displayed in time series in an item of the call history, so that contents of a conversation made in the telephone call can be remembered more easily.

In the information processing terminal according to the invention, the notification unit gives notice of information concerned with emotions of each of calling/called parties, one of the calling/called parties, or both calling and called parties, correspondingly to the parameters stored in the storage unit.

According to this configuration, temporal change in user's own emotions during an incoming call, temporal change in party's emotions during the incoming call, and further, temporal change in emotions as the whole conversation can be visually recognized. Contents of the whole conversation can be recalled after the call from information about the emotions disposed in time series.

In the information processing terminal according to the invention, the storage unit stores face image information correspondingly to each person whose face image is photographed; and after image processing is applied on a face image or face images of each of calling/called parties, one of the calling/called parties, or both calling and called parties read from the storage unit, the notification unit gives notice of the face image or face images as information about an emotion or emotions of the party or parties in question.

According to this configuration, a portable phone user can visually recognize a calling party easily without checking display of the name of the calling party. In addition, time-series face images related to user's own can be easily distinguished from time-series face images related to the party.

The information processing terminal according to the invention further includes a voice input unit for inputting a voice; a parameter generation unit for generating parameters of emotions from the inputted voice; and a notification unit for giving notice of various kinds of information, wherein the information processing terminal further includes an emotion specifying unit for specifying an emotion expressed by a distinctive parameter of the generated parameters; and the notification unit gives notice of information about the specified emotion.

According to this configuration, a distinctive emotion is specified from an inputted voice so that the emotion of a talking person can be prevented from being misread as another emotion.

The information processing terminal according to the invention further includes: a storage unit for storing data; wherein: the storage unit stores the parameters of the emotions generated by the parameter generation unit; and the emotion specifying unit specifies an emotion expressed by a distinctive parameter of the stored parameters.

According to this configuration, parameters of emotions generated from an inputted voice are stored so that the stored parameters of the emotions can be read out to thereby specify a distinctive parameter all the time.

The information processing terminal according to the invention further includes a call device for making a call, wherein the voice input unit inputs voice during a call made by the call unit.

According to this configuration, voice during a call is inputted so that the voice can be input to the information processing terminal easily.

The information processing terminal according to the invention further includes a voice recording unit for recording a voice during a call made by the call unit, wherein the voice input unit inputs a voice recorded by the voice recording unit.

According to this configuration, a portable phone user can know the fact that there is a voice recorded and can judge contents and emergency of the recorded voice simultaneously. As a result, smooth communication can be made.

In the information processing terminal according to the invention, the notification unit includes a display unit for displaying various kinds of information; the storage unit stores the specified emotion in accordance with each call; and when the display unit displays a call history, the display unit displays information about the specified emotion together with the call history.

In the information processing terminal according to the invention, the storage unit stores a part of the voice reflecting the specified emotion; and the display unit displays the part of the voice at the same time point as the specified emotion, together with the call history.

According to this configuration, when a call history is checked, a distinctive emotion during each call is displayed in accordance with the call of the call history so that it is possible to check which emotion a calling/called party was in during that call.

In the information processing terminal according to the invention, the notification unit includes a display unit for displaying various kinds of information; the storage unit stores the specified emotion in accordance with each calling/called party; and when the display unit displays personal information of the calling/called party stored in the storage unit, the display unit displays information about the specified emotion together with the personal information.

According to this configuration, when information of a person is checked, a distinctive emotion during a call with the person is displayed so that it is possible to check which emotion the person was in during the call with a user of the information processing terminal.

In the information processing terminal according to the invention, the notification unit includes a display unit for displaying various kinds of information; the storage unit stores the specified emotion correspondingly to a date for the call; and when the display unit displays a calendar, the display unit displays information about the specified emotion together with the date of the calendar.

According to this configuration, an emotion specified from a call is displayed in accordance with each date so that contents of the call made on that date can be reviewed easily.

In the information processing terminal according to the invention, the notification unit includes a display unit for displaying various kinds of information; the storage unit stores images corresponding to the emotions; and the display unit displays an image read from the storage unit correspondingly to the specified emotion.

According to this configuration, a distinctive emotion is notified as an image so that a user of the information processing terminal viewing this image can check the emotion easily.

In the information processing terminal according to the invention, the storage unit stores a frequency of appearance of an emotion specified by the emotion specifying unit; and the display unit displays an image read from the storage unit correspondingly to the specified emotion in accordance with the frequency of appearance of the emotion.

According to this configuration, an image corresponding to a distinctive emotion is changed and displayed in accordance with a frequency of appearance of the emotion so that entertainment when a notification of the emotion is executed can be enhanced with the result that the emotion notification can be enjoyed for a long term.

In the information processing terminal according to the invention, the notification unit includes a lighting unit for giving notice of various kinds of information by lighting; the storage unit stores colors corresponding to the emotions; and the lighting unit lights in a color read from the storage unit, correspondingly to the specified emotion.

According to this configuration, a distinctive emotion is notified by a color so that a user of the information processing terminal can use his/her sense of sight to check the emotion easily.

In the information processing terminal according to the invention, the notification unit includes a vibration unit for giving notice of various kinds of information by vibration; the storage unit stores vibration frequencies or vibration intensities corresponding to the emotions; and the vibration unit vibrates with a vibration frequency or a vibration intensity read from the storage unit correspondingly to the specified emotion.

According to this configuration, a distinctive emotion is notified by the vibration, so that a user of the information processing terminal can use his/her sense of touch to check the emotion easily.

The information processing terminal according to the invention further includes a reception unit for receiving data from a server where images corresponding to the emotions are recorded, wherein the storage unit stores the received images corresponding to the emotions.

The information processing terminal according to the invention further includes a reception unit for receiving data from a server where colors corresponding to the emotions are recorded, wherein the storage unit stores the received colors corresponding to the emotions.

The information processing terminal according to the invention further includes a reception unit for receiving data from a server where vibration frequencies or vibration intensities corresponding to the emotions are recorded, wherein the storage unit stores the received vibration frequencies or vibration intensities corresponding to the emotions.

According to this configuration, an emotion notifying operation to be performed by the display unit, the lighting unit, or the vibration unit is received from the server provided in the outside of the information processing terminal so that the emotion notifying operation can be added newly and easily with the result that the emotion notification can be enjoyed for a long term.

In the information processing terminal according to the invention, the emotion specifying unit specifies an emotion corresponding to a parameter with a highest numeral value, among the parameters of emotions stored in the storage unit.

According to this configuration, an emotion with a highest numerical value from the start of an inputted voice to the end of the inputted voice is set as a distinctive emotion so that the emotion can be specified by attaching importance to contents of an impressive part in the conversation.

In the information processing terminal according to the invention, the emotion specifying unit specifies an emotion corresponding to a parameter with a highest total of numeral values generated from the start of the voice and the end of the voice, among the parameters of emotions stored in the storage unit.

According to this configuration, an emotion with a highest total of numerical values from the start of a voice to the end of the voice is set as a distinctive emotion so that the emotion can be specified by attaching importance to contents of the whole part in the conversation.

In the information processing terminal according to the invention, the emotion specifying unit specifies an emotion corresponding to a parameter with a highest numeral value generated before the end of the voice, among the parameters of emotions stored in the storage unit.

According to this configuration, an emotion with a highest numerical value before the end of a voice is set as a distinctive emotion so that the emotion can be specified by attaching importance to the implied gist of the conversation.

The information processing terminal according to the invention further includes a transmission unit for transmitting the specified emotion to another information processing terminal.

According to this configuration, information of a distinctive emotion is transmitted to another information processing terminal which cannot estimate talking person's emotions from the voice signal, so that a user of the other information processing terminal can also easily judge the talking person's emotions in the same manner as a user of the information processing terminal.

Effect of the Invention

According to the information processing terminal in the invention, undesirable emotions directly transmitted to a party by a method of directly expressing talking person's emotions in real time can be indicated by another expression unit.

In addition, according to the information processing terminal in the invention, the whole image of a calling status can be reviewed afterward and grasped.

BRIEF DESCRIPTION OF THE DRAWINGS

FIG. 21 A table obtained by measuring a graph shown in FIG. 25 in numerical terms.

FIG. 22 An example in which unit-time emotion parameters shown in FIG. 26 are recalculated while grouped into time-division zones.

FIG. 23 Display examples of an icon when distinctive emotion data are illustratively displayed on the display portion.

FIG. 24 Emission color examples when the distinctive emotion is outputted by an LED.

FIG. 25 LED emission (blinking) pattern examples in accordance with emotion intensity.

FIG. 34 Screen display examples of phone directories with face images of registered persons registered as images corresponding to the registered persons, wherein (A) is screen display of a normal phone directory and (B) is screen display of a phone directory in the portable phone according to the third embodiment.

Figure 1:
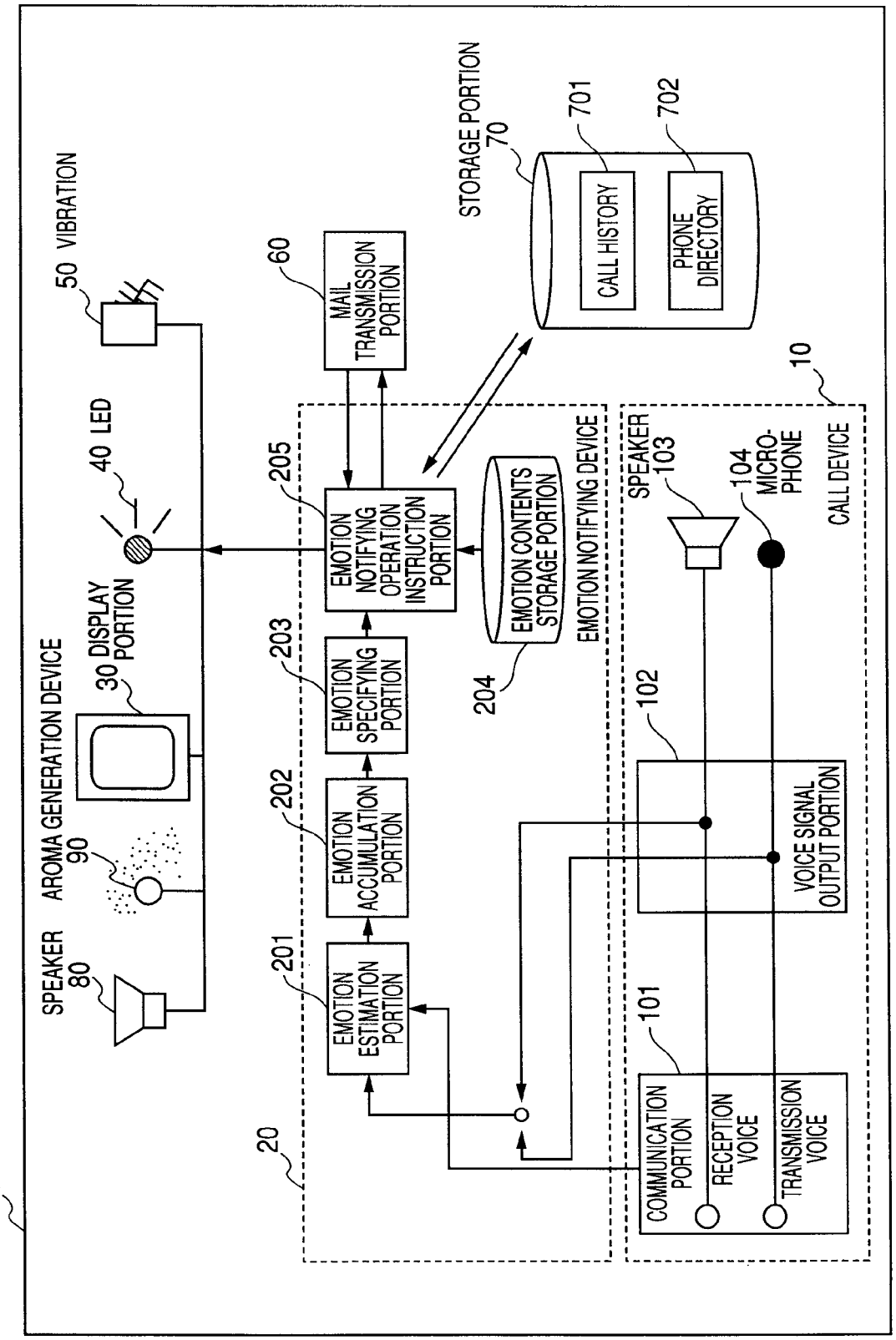
FIG. 1 A diagram of the configuration of a portable phone according to a first embodiment of the invention.

DESCRIPTION OF REFERENCE NUMERALS 1, 11 portable phone
10 call device
101 communication portion
102 voice signal output portion
103 speaker
104 microphone
105 guidance voice storage portion
106 voice storage portion
2 emotion contents storage server
20 emotion notifying device
201 emotion estimation portion
202 emotion accumulation portion
203 emotion specifying portion
204 emotion contents storage portion
205 emotion notifying operation instruction portion
206 emotion contents acquisition portion
30 display portion
40 LED
50 vibration
60 mail transmission portion
70 storage portion
80 speaker
90 aroma generation device
95 input operation portion

BEST MODE FOR CARRYING OUT THE INVENTION

Modes of an information processing terminal for carrying out the invention will be described below in detail while a portable phone is used as the information processing terminal by way of example.

First Embodiment

A portable phone according to a first embodiment of the invention will be described in detail with reference to the drawings. FIG. 1 shows a diagram of the configuration of the portable phone according to the first embodiment of the invention. The portable phone according to the first embodiment of the invention includes a call device 10 for controlling a voice call, an emotion notifying device 20 for specifying an emotion of a portable phone user, an emotion of a calling/called party, or the emotions of the both based on a voice or voices inputted during a call through the call device 10, and devices such as a display portion 30, an LED 40, a vibration 50, a speaker 80, an aroma generation device 90, etc. for notifying the portable phone user of the emotion or emotions specified by the emotion notifying device 20.

In the call device 10, a voice signal output portion 102 outputs, to the emotion notifying device 20, a voice signal received from a calling/called party through a communication portion 101 for transmitting/receiving a voice signal, or a voice signal of the portable phone user collected by a microphone 104. In addition, the voice signal output portion 102 outputs the voice received from the calling/called party to a speaker 103 while outputting the call voice of the portable phone user collected by the microphone 104 to the communication portion 101.

In the emotion notifying device 20, when the emotion estimation portion 201 is notified of start of a call by the communication portion 101 of the call device 10, the emotion estimation portion 201 estimates talking person's emotions from the voice signal inputted from the call device 10. On this occasion, the voice signal received from the calling/called party, the voice signal of the portable phone user, or the voice signals of the both are inputted to the emotion estimation portion 201. Design may be made so that the portable phone user can select a voice signal to be inputted from the call device 10 or setting may be made so that voice signals to be inputted from the call device 10 are switched every fixed time.

Figure 2:
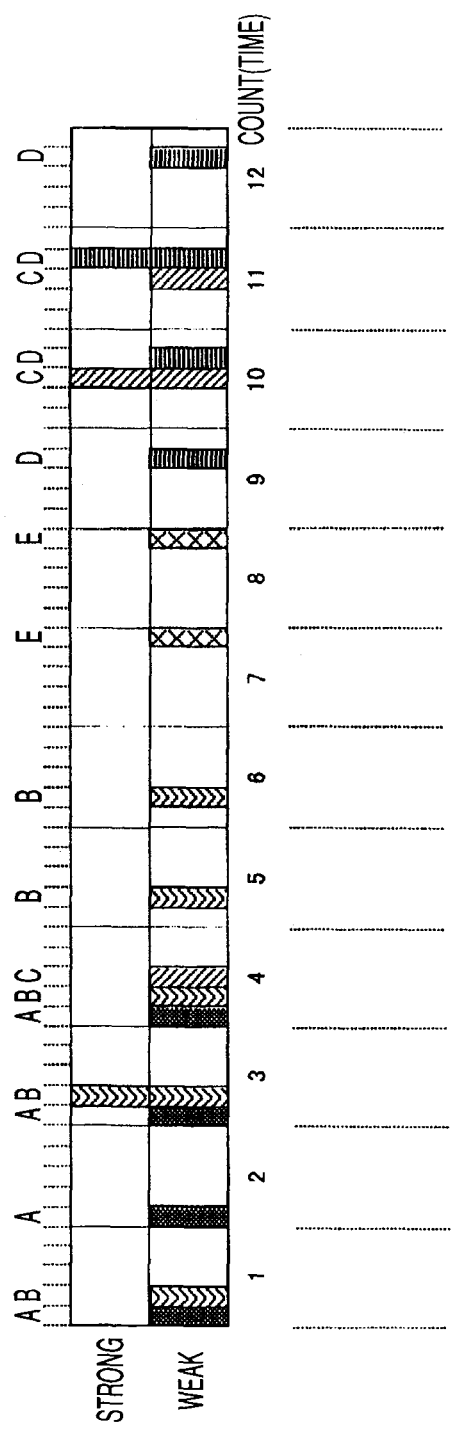
FIG. 2 An example of emotion estimation made by the portable phone according to the first embodiment of the invention.

The emotion estimation portion 201 estimates talking person's emotions from the voice signal inputted from the call device 10. FIG. 2 shows an example of emotion estimation performed by the portable phone according to the first embodiment of the invention. The emotion estimation portion 201 constantly estimates the degree of each emotion expressed by a value 0, 1 or 2 (0: no emotion, 1: weak emotion, 2: strong emotion) from the start of a call to the end of the call in accordance with each of factors of emotion information, e.g. consisting of love, happiness/excitement, anger, sadness, and neutral, as shown in FIG. 2. The emotion estimation portion 201 outputs the respective estimated numerical values one after another to an emotion accumulation portion 202.

The emotion accumulation portion 202 accumulates the numerical values for each factor inputted from the emotion estimation portion 201, in accordance with the inputted time points or order.

An emotion specifying portion 203 reads the accumulated numerical values for each factor from the start of a call to the end of the call in the call from the emotion accumulation portion 202, specifies a distinctive emotion from the read numeral values, and outputs the distinctive emotion to an emotion notifying operation instruction portion 205. When an emotion with a largest numerical value from the start of the call to the end of the call is set as the distinctive emotion in the specification, the emotion can be specified by attaching importance to contents of an impressive part in the call. In addition, when an emotion with a largest total of the numerical values from the start of the call to the end of the call is set as the distinctive emotion, the emotion can be specified by attaching importance to contents of the whole part in the call. Moreover, when an emotion with a largest numerical value just before the end of the call is set as the distinctive emotion, the emotion can be specified by attaching importance to the implied gist of the conversation.

The emotion specifying portion 203 clips a voice in a fixed time (e.g. 2 seconds) for reflecting the specified distinctive emotion, and stores the clipped voice as distinctive voice information in the emotion accumulation portion 202 so that the clipped voice is recorded in a call history when the call history is reviewed afterward.

The emotion specifying portion 203 may be designed to receive the numerical values for each factor outputted one after another from the emotion estimation portion 201 not through the emotion accumulation portion 202 but directly so that the emotion specifying portion 203 specifies the distinctive emotion constantly. In this manner, the distinctive emotion can be specified synchronously with the call.

When the distinctive emotion is inputted to the emotion notifying operation instruction portion 205, the emotion notifying operation instruction portion 205 reads an emotion notifying operation corresponding to the distinctive emotion from an emotion contents storage portion 204 for storing emotion notifying operations to be performed by the devices such as the display portion 30, the LED 40, the vibration 50 etc., and outputs an operation instruction to these devices. Setting may be made so that the emotion notifying operation is executed by a device predetermined by the portable phone user. Alternatively, the emotion notifying operation may be executed simultaneously by a plurality of devices so that power of expression of the emotion notification can be enhanced. Operation examples of an emotion notifying operation to be made by the display portion 30 and the LED 40 will be described below with reference to the drawings.

Figure 3:
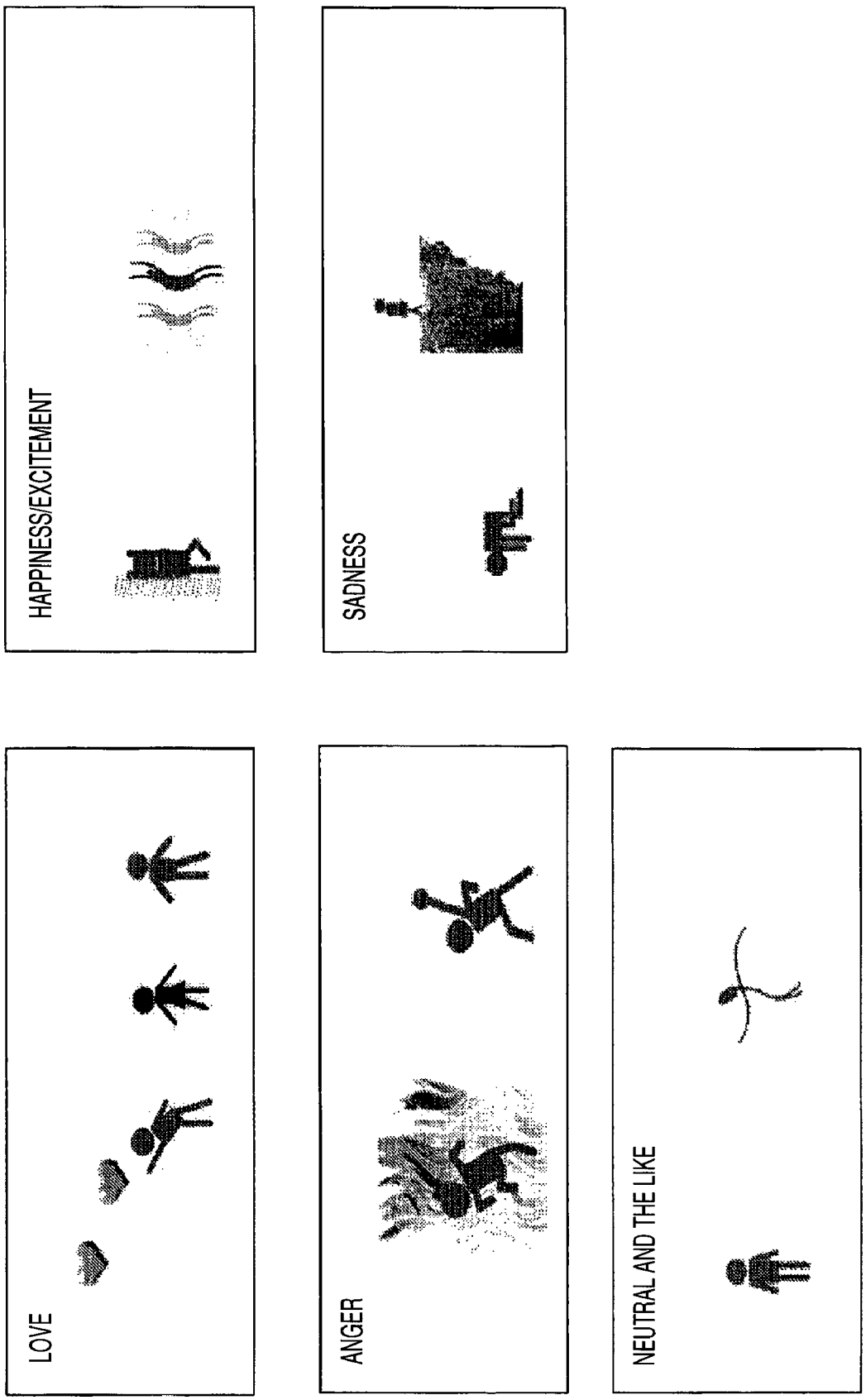
FIG. 3 Display examples of images on a display portion of the portable phone according to the first embodiment of the invention.

FIG. 3 shows display examples of images on the display portion of the portable phone according to the first embodiment of the invention. When a distinctive emotion is inputted to the emotion notifying operation instruction portion 205 in the case where a notification operation of the emotion will be executed by the display portion 30, the emotion notifying operation instruction portion 205 reads an image corresponding to the distinctive emotion from the emotion contents storage portion 204, so as to instruct the display portion 30 to output the read image. When the display portion 30 displays one of the images shown in FIG. 3 correspondingly to the distinctive emotion, the portable phone user can use his/her sense of sight to easily judge the talking person's emotion. Incidentally, the display portion 30 may include a sub liquid crystal display (LCD) portion (smaller in display area than a main LCD portion, often provided in the back of the main LCD portion of the portable phone, and also referred to as back liquid crystal) provided in a latest portable phone. As other display examples to be performed by the display portion 30, a background color of information to be displayed on the display portion 30 may be changed correspondingly to the emotion, a series of ideographs, images, pictographs, etc. may be displayed continuously (motion graphic), or a photographed image or stored video may be displayed.

Figure 4:
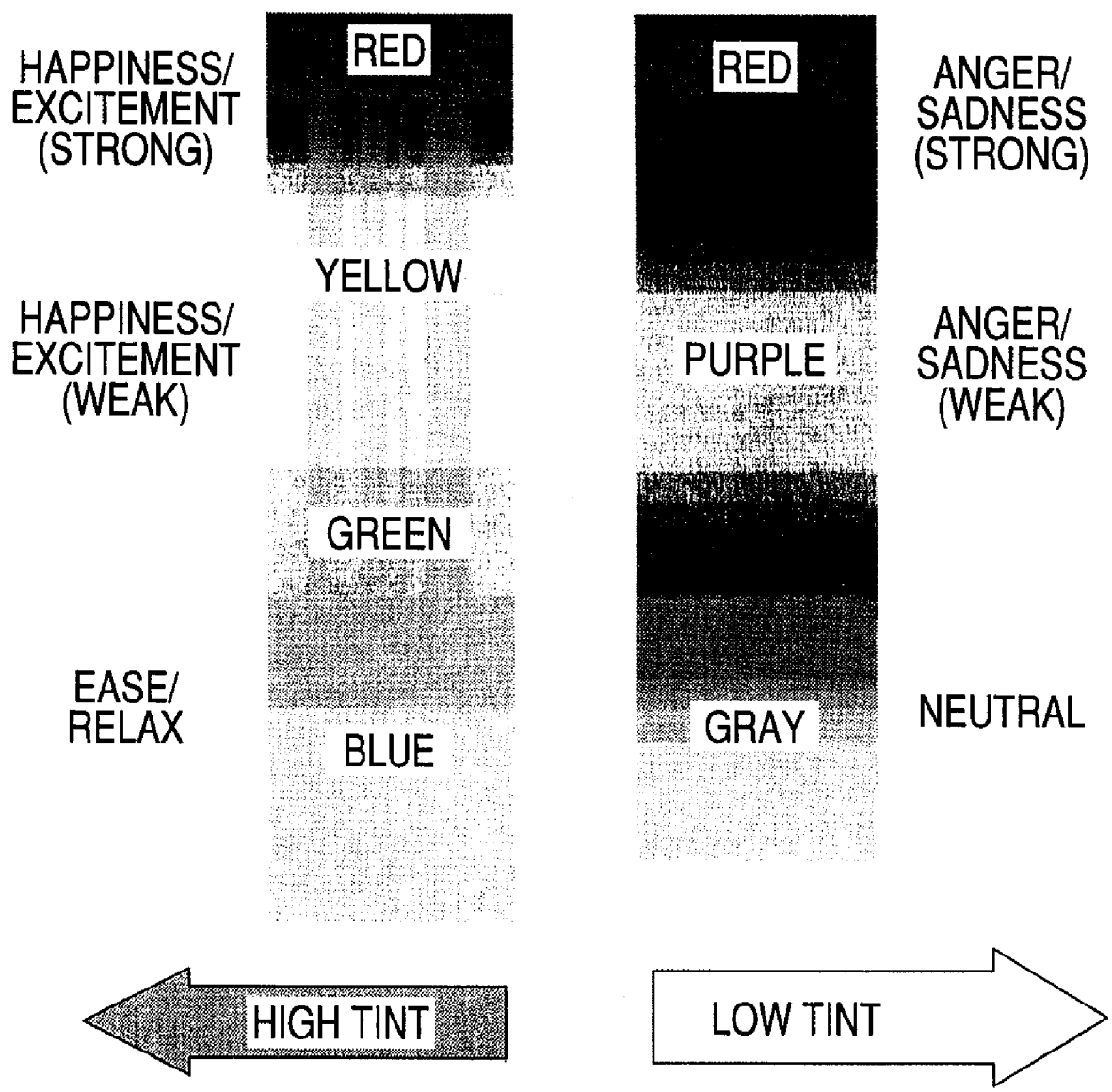
FIG. 4 A lighting example of an LED in the portable phone according to the first embodiment of the invention.

FIG. 4 shows an example of switching on the LED in the portable phone according to the first embodiment of the invention. When a distinctive emotion is inputted to the emotion notifying operation instruction portion 205 in the case where an emotion notifying operation will be executed by the LED 40, the emotion notifying operation instruction portion 205 reads color information corresponding to the distinctive emotion from the emotion contents storage portion 204 and instructs the LED 40 to emit light with the read color. When the LED 40 emits light with one of colors shown in FIG. 4 correspondingly to the distinctive emotion, the portable phone user can judge the talking person's emotion visually easily. The LED may include backlights of operating keys provided in the portable phone. As a method for switching on the LED, color or intensity of the emitted light, emission range, or blinking rhythm (the interval of blinking may be changed in accordance with the emotion or the LED may be blinked on and off in accordance with sound outputted from the speaker 80 which will be described later or in accordance with vibration of the vibration which will be described later) may be changed in accordance with the emotion. When there are a plurality of LEDs, the LEDs may emit lights in different colors respectively or the LEDs may be regarded as dots used for expressing a character or mark for indicating the emotion.

When a distinctive emotion is inputted to the emotion notifying operation instruction portion 205 in the case where a notification operation of the emotion will be executed by the vibration 50, the emotion notifying operation instruction portion 205 reads vibration information of the vibration corresponding to the distinctive emotion from the emotion contents storage portion 204, so as to instruct the vibration 50 to vibrate with a vibration frequency or vibration intensity contained in the read vibration information. When the vibration 50 vibrates with the vibration frequency or vibration intensity corresponding to the distinctive emotion (e.g. if fluctuation of the emotion is small, the vibration intensity is reduced. If fluctuation of the emotion is large, the vibration intensity is increased), the portable phone user can use his/her sense of touch to easily judge the talking person's emotion. Incidentally, the vibration 50 may be designed to vibrate together with a sound outputted by the speaker 80 which will be described later. As a method for combining vibration of the vibration 50 with sound output of the speaker 80, for example, there is a method for vibrating the vibration 50 with a reduced vibration intensity if fluctuation of the emotion is small, and vibrating the vibration 50 with a vibration frequency corresponding to the frequency of the sound and with an increased vibration intensity if the fluctuation is large.

When a distinctive emotion is inputted to the emotion notifying operation instruction portion 205 in the case where a notification operation of the emotion will be executed by the speaker 80, the emotion notifying operation instruction portion 205 reads sound information corresponding to the distinctive emotion from the emotion contents storage portion 204, so as to instruct the speaker 80 to output the read sound information. When the speaker 80 outputs the sound information corresponding to the distinctive emotion (e.g. different music songs or melodies may be set in accordance with respective emotions. A ring tone melody to be sounded by the portable phone whenever there is an incoming call may be selected as the melody), the portable phone user can use his/her sense of hearing to easily judge the talking person's emotion. Although description has been made on the configuration in which different music songs or melodies are set in accordance with respective emotions, a music song or melody common to a plurality of emotions may be set while the tone of the music song or melody is set to vary in accordance with each emotion.

When a distinctive emotion is inputted to the emotion notifying operation instruction portion 205 in the case where a notification operation of the emotion will be executed by the aroma generation device 90, the emotion notifying operation instruction portion 205 reads aroma information corresponding to the distinctive emotion from the emotion contents storage portion 204, so as to instruct the aroma generation device 90 to generate an aroma corresponding to the read aroma information. When the aroma generation device 90 generates the aroma corresponding to the distinctive emotion, the portable phone user can use his/her sense of smell to easily judge the talking person's emotion. Although the configuration may be made so that different aromas are generated in accordance with respective emotions, an aroma common to a plurality of emotions may be set alternatively while concentration of the aroma is set to vary in accordance with each emotion.

The portable phone according to the invention may be configured to use any one of the devices such as the display portion 30, the LED 40, the vibration 50, the speaker 80, the aroma generation device 90, etc. or may be configured to operate a plurality of devices in combination.

The emotion notifying operation instruction portion 205 instructs a mail transmission portion 60 in FIG. 1 to transmit another portable phone an emotion notifying operation corresponding to a distinctive emotion read from the emotion contents storage portion 204. When emotion notifying operation information corresponding to a distinctive emotion is transmitted by mail to another portable phone provided with no emotion notifying device 20 so as to be incapable of estimating talking person's emotions from the voice signal, a user of the other portable phone can easily judge the talking person's emotion in the same manner as the portable phone user. The mail may be transmitted after the portable phone user has checked the emotion notifying operation or the mail may be transmitted to the portable phone of the calling/called party automatically.

The emotion notifying operation instruction portion 205 instructs a storage portion 70 in FIG. 1 to record the distinctive emotion specified by the emotion specifying portion 203 and a calling status in the call from which the emotion is specified, into a call history 701. The call history 701 is recorded in the storage portion 70 and indicates calling statuses such as calling/called parties, calling time points, calling times, etc. in past calls. When the portable phone user displays the call history 701 on the display portion 30 and has checked one of the emotions recorded in the call history after the call history 701 has been recorded, an emotion notifying operation corresponding to the emotion recorded in the call history is read from the emotion contents storage portion 204 so that an operation instruction is outputted to these devices.

In the background art, it was difficult to review contents of a past call from a call history because a past conversation status could not be checked by checking the transmission/reception history like a mail transmission/reception history even if the call history had been recorded. According to the portable phone in the first embodiment of the invention, an emotion specified from a certain call and a calling status in the call are recorded in the call history so that which emotion the portable phone user or the calling/called party was in during the call can be checked and calling contents in the call can be reviewed easily when the call history has been checked.

When the emotion notifying operation instruction portion 205 is to read an emotion notifying operation corresponding to a distinctive emotion from the emotion contents storage portion 204, the emotion notifying operation instruction portion 205 may read another emotion notifying operation different from the emotion notifying operation normally read, if internal factors due to the emotion notifying device 20 such as the notification frequency of an emotion notified by the portable phone, or external factors due to a device other than the emotion notifying device 20 such as date and time when the emotion notifying operation is read, a calling time of the portable phone, or a present position specified by a position information acquisition function provided in the portable phone satisfy a specific condition. On this occasion, the specific condition contains the case where the emotion specifying portion 203 has specified a certain emotion a predetermined number of times or more in the terms of the notification frequency of an emotion, the case where the date is a date such as the New Year or the Christmas Day or the time is consistent with or included in a time zone of noon, night, midnight, etc. in the terms of date and time, and the case where the present position is included in or close to a place such as an amusement park, a sea, etc. in the terms of a present position.

Figure 5:
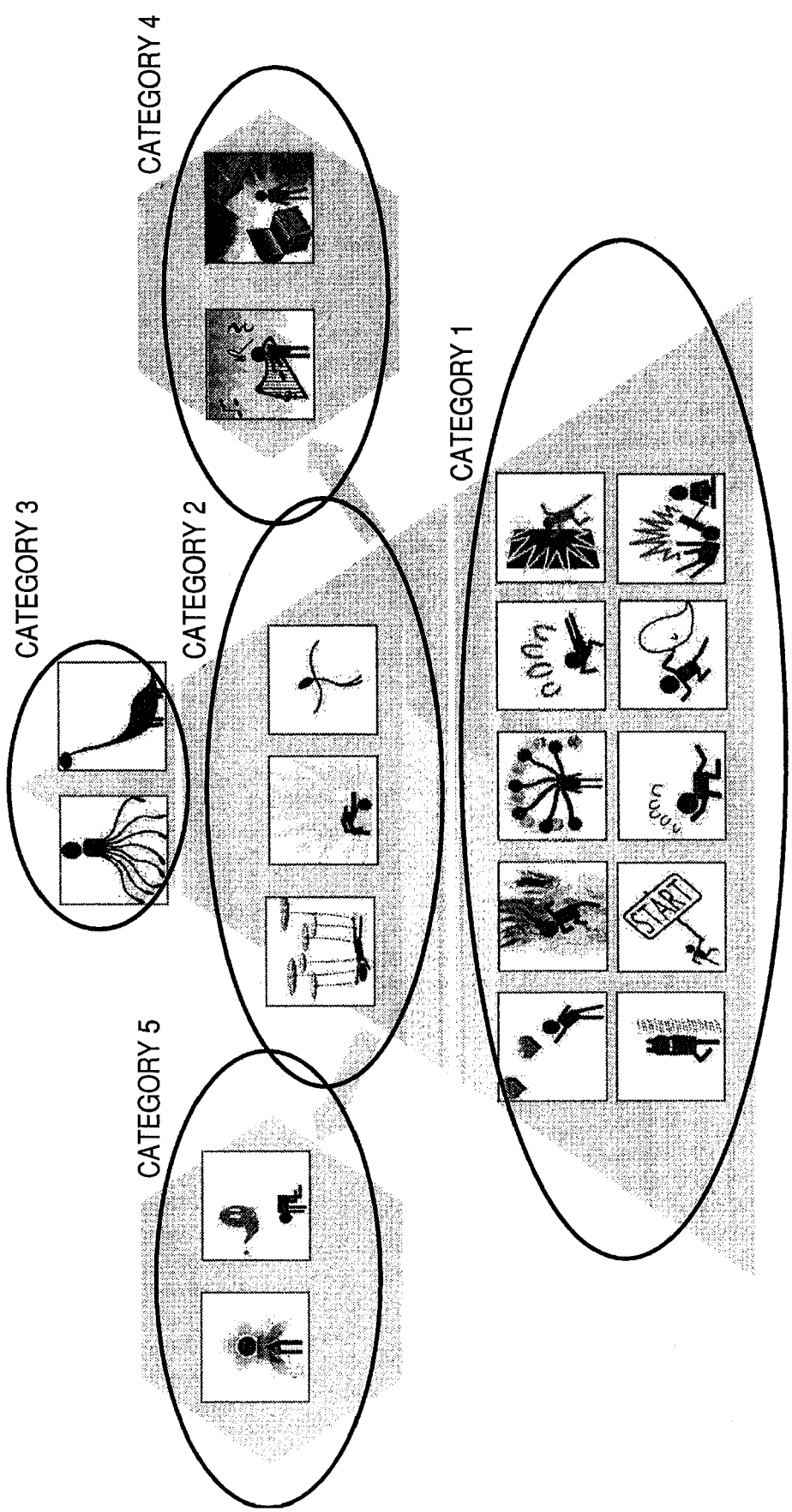
FIG. 5 Categories of images to be displayed on the display portion of the portable phone according to the first embodiment of the invention.

FIG. 5 shows categories of images to be displayed on the display portion of the portable phone according to the first embodiment of the invention. A category 1 includes images to be displayed on the display portion 30 unconditionally. A category 2 includes images to be displayed when a certain emotion has been specified a predetermine number of times or more. A category 3 includes images to be displayed coincidentally with a very low probability when a certain emotion has been specified. The categories 1, 2 and 3 are sorted in accordance with each internal factor so that the display frequency decreases from the category 1 toward the category 3. A category 4 includes images to be displayed when the present position of the portable phone is included in a predetermined place. A category 5 includes images to be displayed when the present position of the portable phone is included in a predetermined place and a calling time of the portable phone has been beyond a predetermined time. The categories 4 and 5 are chiefly sorted in accordance with each external factor. By setting the display frequency for each image in this manner, the portable phone user can enhance entertainment when an emotion notification is executed by the portable phone. Accordingly, the portable phone user can enjoy the emotion notification for a long term.

Although description has been made on the case where a distinctive emotion specified by the emotion specifying portion 203 and a calling status in a call from which the emotion was specified are recorded in the call history 701 of the storage portion 70, an emotion notifying operation read from the emotion contents storage portion 204 correspondingly to the distinctive emotion and the calling status in the call from which the emotion was specified may be recorded. With this configuration, when the portable phone user has checked an emotion recorded in the call history 701, the emotion notifying operation instruction portion 205 can read an emotion notifying operation corresponding to the emotion recorded in the call history, directly from the call history without spending time on retrieval of the emotion notifying operation from the emotion contents storage portion 204. Accordingly, the time taken from checking of the emotion recorded in the call history to operation of the device can be shortened.

Figure 6:
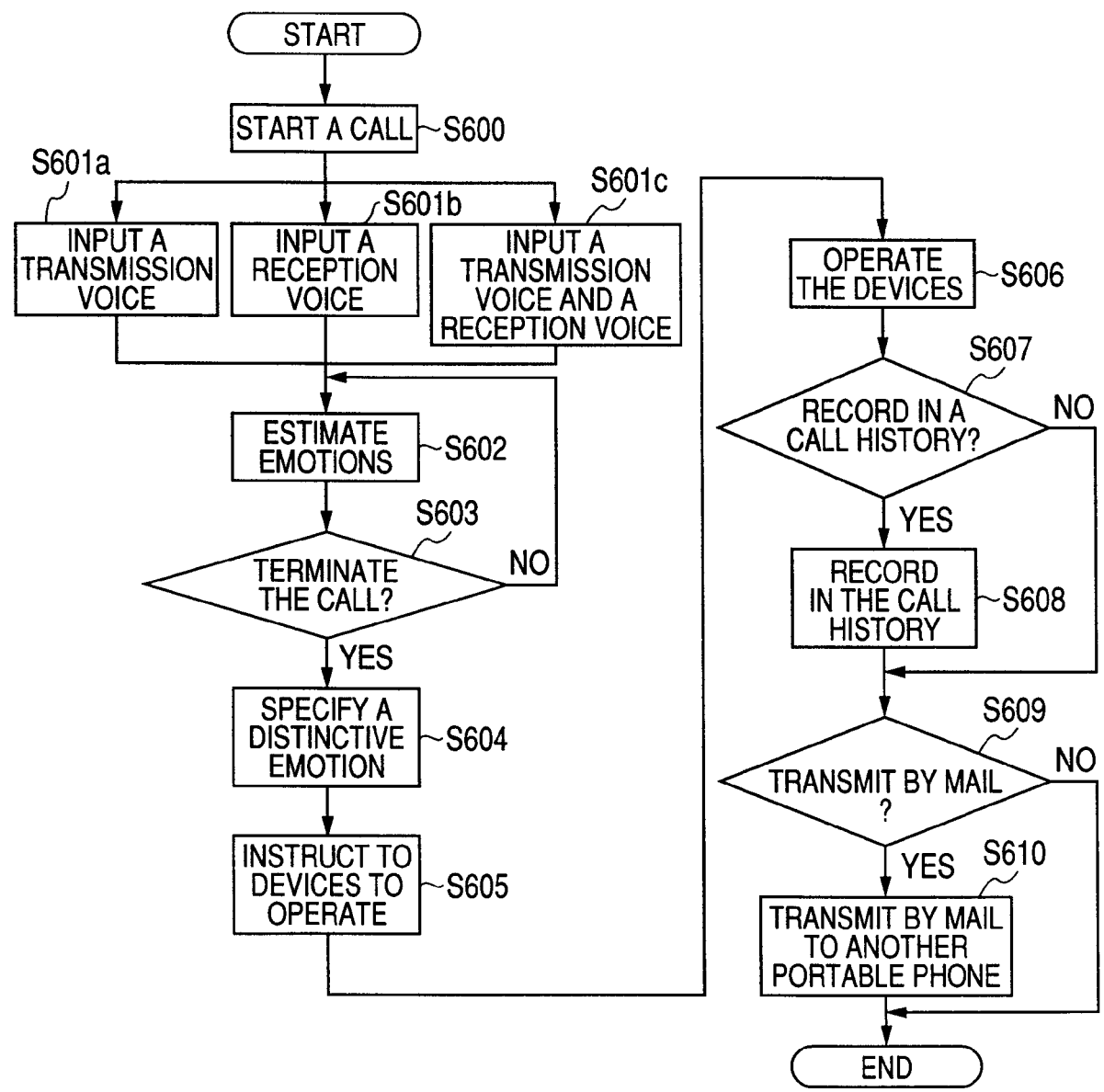
FIG. 6 A flow chart showing a processing flow to be performed by the portable phone according to the first embodiment of the invention.

Next, a processing flow from input of a voice to notification and recording of an emotion in the portable phone according to the first embodiment of the invention will be described. FIG. 6 shows a flow chart showing the processing flow to be performed by the portable phone according to the first embodiment of the invention.

When the emotion estimation portion 201 is notified of the start of a call by the communication portion 101 (S600), a voice signal or voice signals are inputted from the voice signal output portion 102 to the emotion estimation portion 201 (S601a to S601c). On this occasion, a voice signal received from a calling/called party, a voice signal of the portable phone user or both the voice signals are inputted. The emotion estimation portion 201 estimates emotions of each talking person from the inputted voice signal (S602), so as to sequentially output estimated numerical values for each primary factor of the emotion information to the emotion accumulation portion 202. When the emotion estimation portion 201 is notified of the end of the call by the communication portion 101 (S603), the emotion specifying portion 203 specifies a distinctive emotion based on the numerical values for each factor from the start of the call to the end of the call in a certain call (S604) so as to output the distinctive emotion to the emotion notifying operation instruction portion 205. When the distinctive emotion is inputted to the emotion notifying operation instruction portion 205, the emotion notifying operation instruction portion 205 reads an emotion notifying operation corresponding to the distinctive emotion from the emotion contents storage portion 204 so as to output an operation instruction to the devices such as the display portion 30, the LED 40, the vibration 50, etc. (S605).

When the portable phone user instructs to record the distinctive emotion or the emotion notifying operation corresponding to the distinctive emotion and a calling status into the call history 701 (YES in S607), the distinctive emotion or the emotion notifying operation corresponding to the distinctive emotion and the calling status are recorded in the call history 701 (S608). When the portable phone user instructs to transmit the emotion notifying operation corresponding to the distinctive emotion to another portable phone (S609), the emotion notifying operation information is transmitted to the other portable phone (S610).

Figure 14:
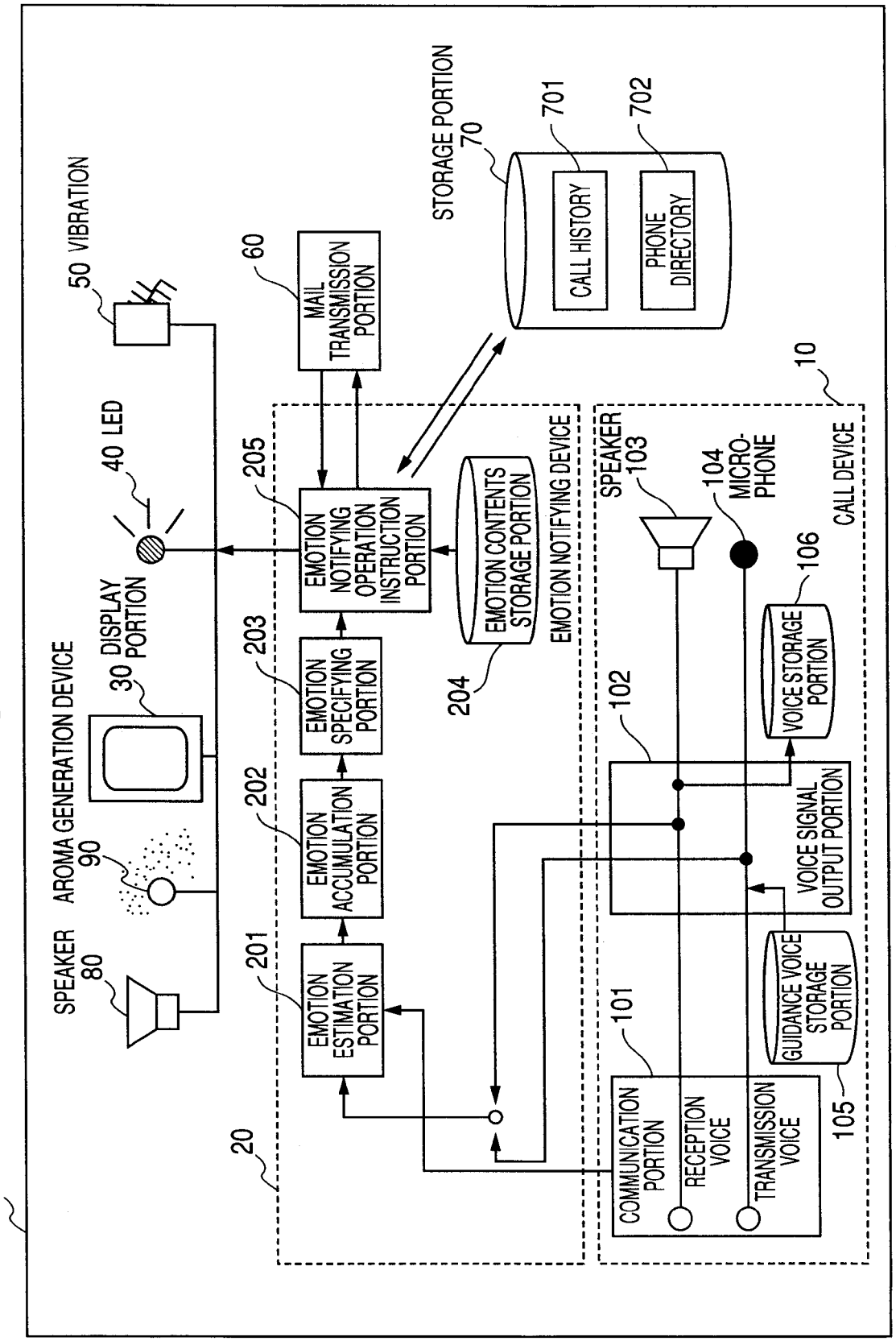
FIG. 14 A diagram of the configuration of another example of the portable phone according to the first embodiment of the invention.
Figure 15:
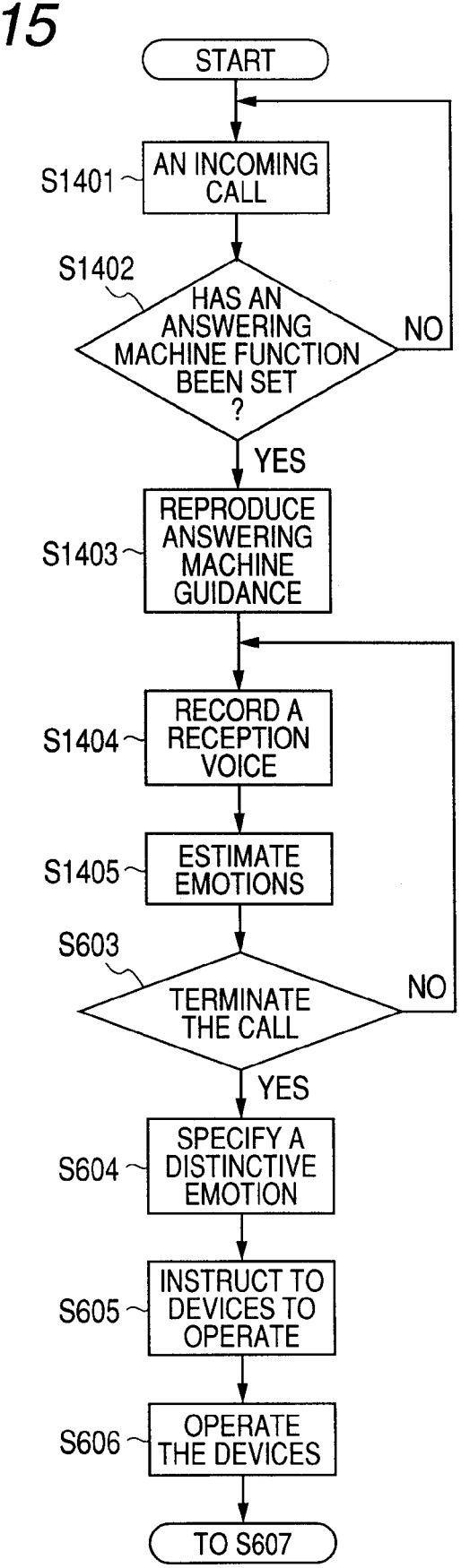
FIG. 15 A flow chart showing another example of a processing flow to be performed by the portable phone according to the first embodiment of the invention.
Figure 16:
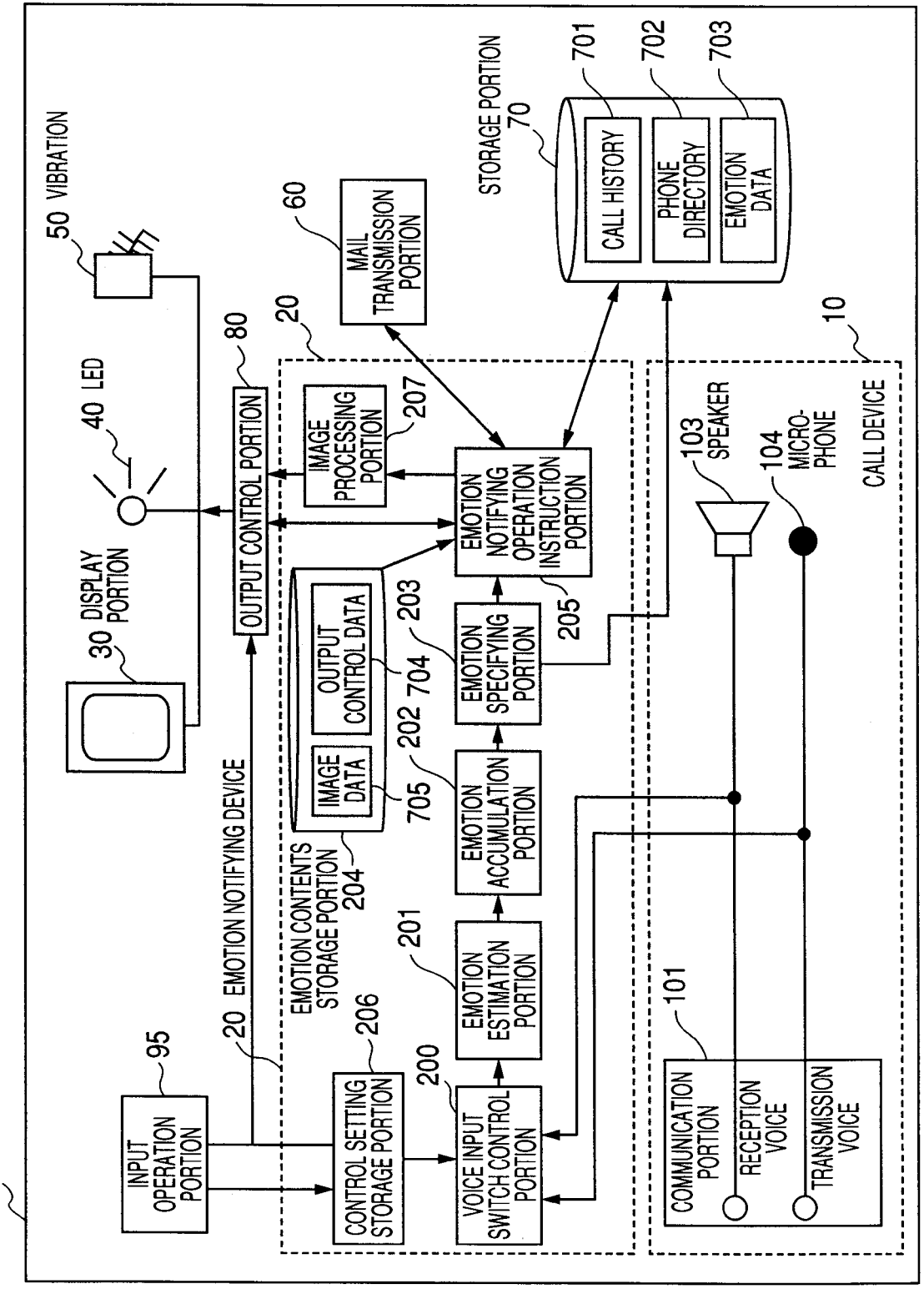
FIG. 16 A diagram of the configuration of a portable phone according to a third embodiment of the invention.

In the flow chart of FIG. 6, description has been made on the case where the portable phone according to the first embodiment of the invention in the configuration shown in FIG. 1 performs a process of estimating talking person's emotions from the voice signal inputted during a call. However, a process of estimating talking person's emotions from the voice signal inputted through another means may be conceivable. Here, as an example of the other means, an answering machine function provided in a latest portable phone (a function of the portable phone for automatically answering an incoming voice call and recording a voice of a calling party when the portable phone user cannot answer the incoming voice call. The following description will be made on the assumption that the voice of the calling party is stored in a storage device provided in the portable phone is used and the process of estimating emotions from the voice signal recorded by the answering machine function will be described. FIG. 14 shows a diagram of the configuration of another example of the portable phone according to the first embodiment of the invention. FIG. 15 shows a flow chart showing another example of a processing flow to be performed by the portable phone according to the first embodiment of the invention. Incidentally, in FIGS. 14 and 15, functions of respective portions and respective steps to which the same reference numerals as those in FIGS. 1 and 6 are assigned are the same as described above for the sake of omission of description.

In FIG. 14 which is a diagram of the configuration of the portable phone, a guidance voice storage portion 105 and a voice storage portion 106 are further added to the configuration of FIG. 1. The guidance voice storage portion 105 has stored a voice signal for outputting, by voice to a calling party, a message that the portable phone user cannot answer the incoming voice call, when the call device 10 automatically answers the incoming voice call in the case where the portable phone user cannot answer the incoming voice call. The voice storage portion 106 stores a voice signal received from the calling party after the call device 10 has automatically answered the incoming voice call.

Next, a processing flow for giving notice of an emotion based on a voice recorded by use of the answering machine function in the portable phone according to the first embodiment of the invention will be described with reference to FIG. 15.

Upon acceptance of an incoming voice call (step S1401), the communication portion 101 judges whether the portable phone has been set to use the answering machine function (step S1402). When the communication portion 101 decides that the portable phone has been set to use the answering machine function (in the case of the portable phone which has been set to use the answering machine function when there is no response to an incoming call for a predetermined time since acceptance of the incoming call, a criterion for judging whether a time counted since acceptance of the incoming call exceeds the predetermined time or not is added to the criterion of the step S1402. The criterion for judging whether the portable phone has been set to use the answering machine function as in this case is added and combined appropriately), the voice signal output portion 102 outputs the voice signal read from the guidance voice storage portion 105 as a transmission voice in response to the incoming voice call (S1403). When a reception voice from the calling party is inputted by the communication portion 101 to the voice signal output portion 102 after the step S1403, the voice signal output portion 102 stores the reception voice into the voice storage portion 106. The emotion estimation portion 201 estimates emotions of the talking person from the voice signal inputted through the voice signal output portion 102 and stored in the voice storage portion 106. When the call is then terminated in a process of step S603, the voice signal output portion 102 completes the process for storing the reception voice into the voice storage portion 106 and controls the various devices to execute an emotion notifying operation based on the emotion estimated by the emotion estimation portion 201.

In a background-art answering machine function, since only information indicating that there was a voice recorded in the answering machine was notified by notification units (a display portion, an LED, a vibration, etc.), contents and emergency of the recorded voice per se could not be known unless the recorded voice was reproduced. For this reason, a portable phone user might know the fact that there was a voice recorded, but could not decide that the recorded voice is for contents with high emergency. As a result, the portable phone user did not reproduce the recorded voice so that communication with a calling party who had recorded the voice was interrupted. When configuration is made as in the portable phone according to the first embodiment of the invention, a voice of a calling party is recorded by use of the answering machine function and information about an emotion estimated from the voice signal recorded by the answering machine function is notified. With this configuration, the portable phone user can know the fact there is a voice recorded and judge contents and emergency of the recorded voice simultaneously. As a result, the portable phone user can perform smooth communication. In such a configuration, the portable phone user can achieve smooth communication more effectively particularly in a situation that the portable phone user cannot answer an incoming call under some circumstances but can know the fact that there is a voice which is being recorded or a voice which has been recorded in a comparatively short time (e.g. in the case where the portable phone user is in a train or in a meeting).

Figure 7:
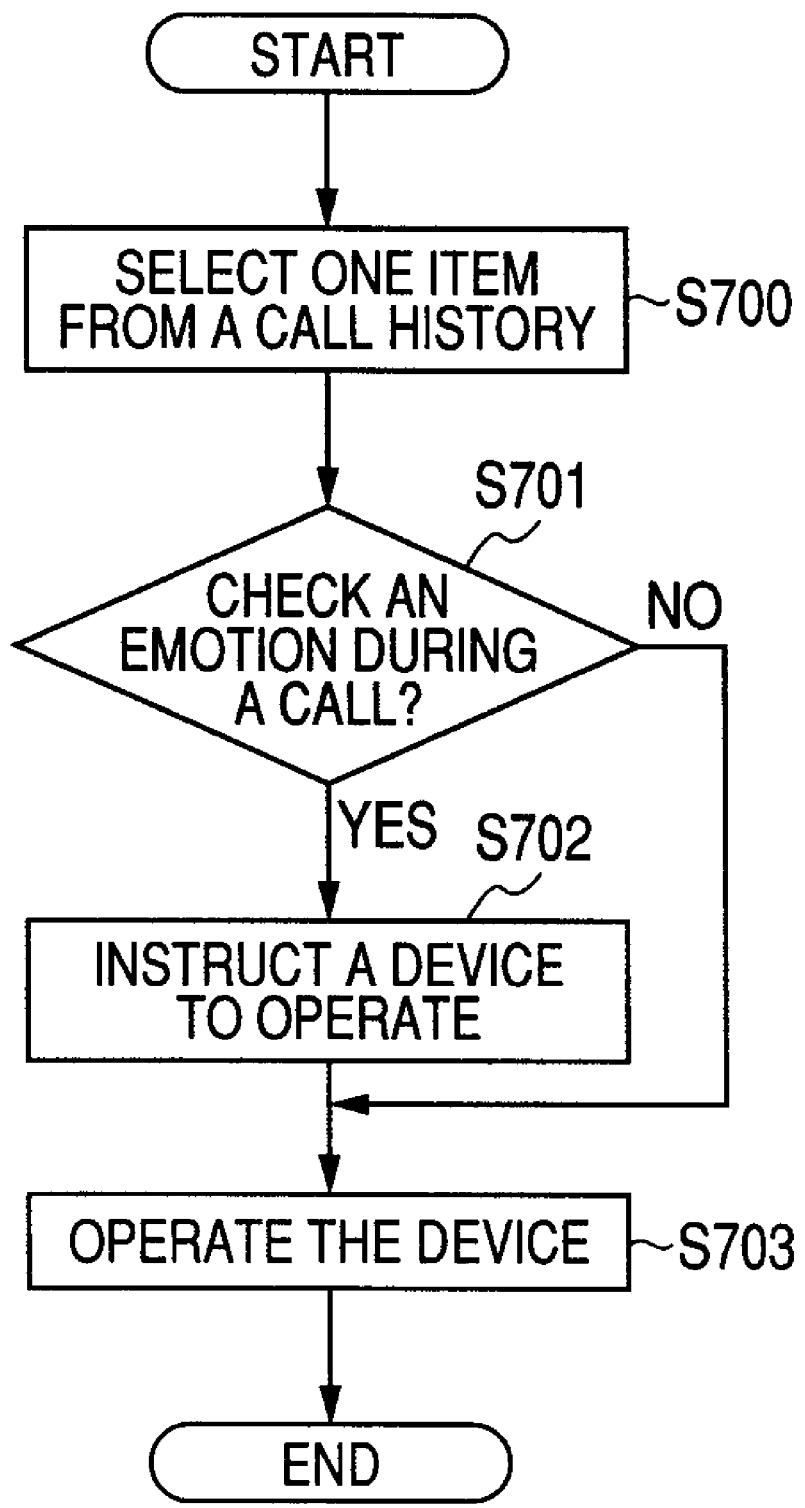
FIG. 7 A flow chart for checking a call history in the portable phone according to the first embodiment of the invention.
Figure 8:
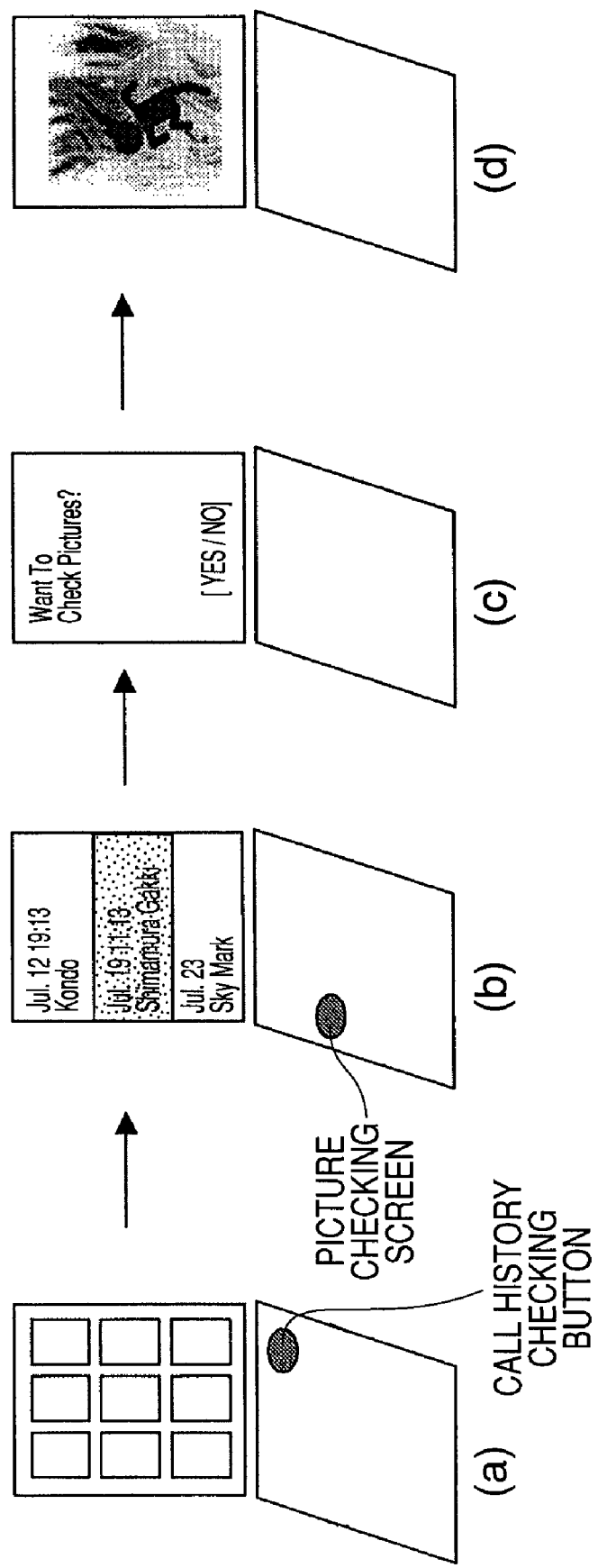
FIG. 8 A display example of the call history on the display portion in the portable phone according to the first embodiment of the invention.

Next, a processing flow for checking a call history in the portable phone according to the first embodiment of the invention will be described. FIG. 7 shows a flow chart for checking the call history in the portable phone according to the first embodiment of the invention. FIG. 8 shows a display example of the call history on the display portion in the portable phone according to the first embodiment of the invention.

When the portable phone user pushes a call history checking button in FIG. 8(a) so as to display a call history shown in FIG. 8(b) on the display portion 30, and then selects one item from the call history (S700) so as to try to check an emotion in a call for the item (YES in S701), the emotion notifying operation instruction portion 205 reads a distinctive emotion recorded in the call history 701, and reads an image corresponding to the distinctive emotion from the emotion contents storage portion 204 so as to instruct the display portion 30 to display the image (S702). The display portion 30 outputs the image shown in FIG. 8(d) (S703).

When an emotion specified from a call and a calling status in the call are recorded in the call history in this manner, which emotion the portable phone user or the calling party was in during the call can be checked and calling contents in the call can be easily reviewed if the call history has been checked.

Although description has been made on the case where a specified distinctive emotion is checked by use of the call history in the portable phone according to the first embodiment of the invention, the invention is not limited to the call history. Alternatively, the specified distinctive emotion may be checked by use of a phone directory or a scheduler used as a function of the portable phone. A processing flow for checking a phone directory and a processing flow for checking a scheduler in the portable phone according to the first embodiment of the invention will be described below.

Figure 9:
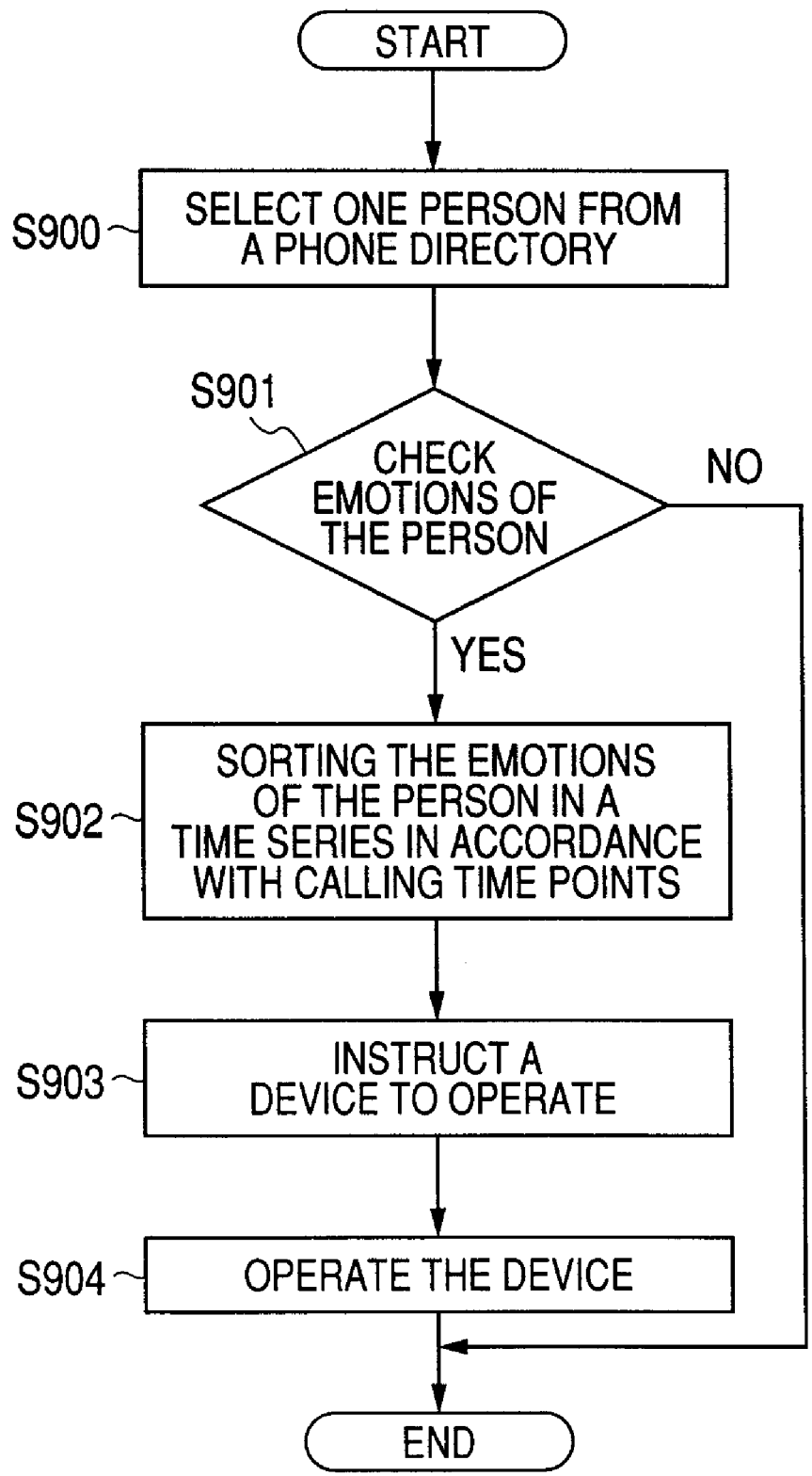
FIG. 9 A flow chart for checking a phone directory in the portable phone according to the first embodiment of the invention.
Figure 10:
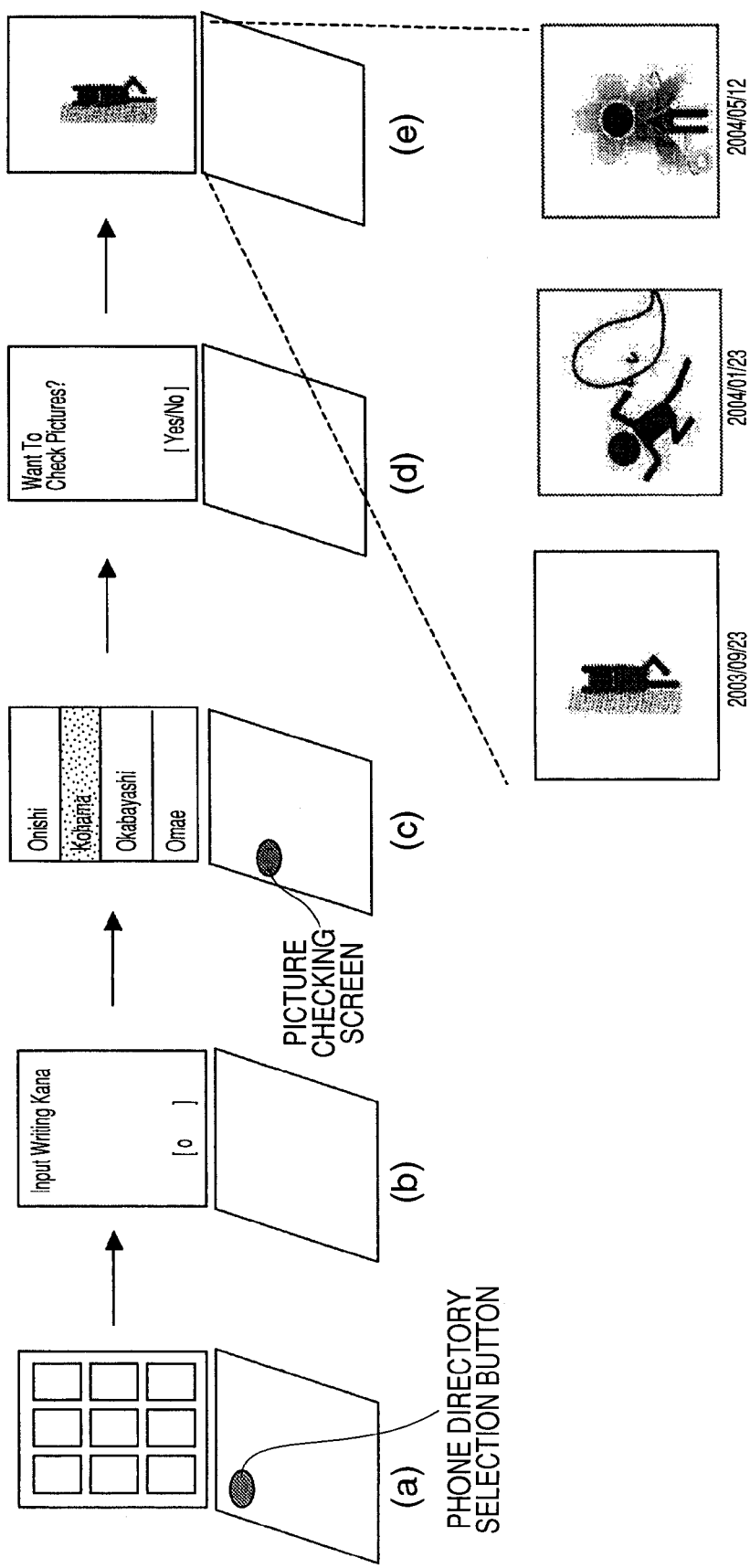
FIG. 10 A display example of the phone directory on the display portion in the portable phone according to the first embodiment of the invention.

The processing flow for checking a phone directory in the portable phone according to the first embodiment of the invention will be described. FIG. 9 shows a flow chart for checking a phone directory in the portable phone according to the first embodiment of the invention. FIG. 10 shows a display example of the phone directory on the display portion in the portable phone according to the first embodiment of the invention.

After the distinctive emotion or the emotion notifying operation corresponding to the distinctive emotion has been recorded in a phone directory 702 together with the calling time point, as calling party's personal information recorded in the phone directory, in the step 608 shown in FIG. 6, the portable phone user pushes a phone directory selection button in FIG. 10(a) so as to display the phone directory on the display portion 30, and then selects one person from the phone directory as shown in FIG. 10(c) (S900) so as to try to check emotions of the person during calls (YES in S901). On this occasion, the emotion notifying operation instruction portion 205 reads distinctive emotions recorded in the phone directory 702 (S902), and reads images corresponding to the distinctive emotions from the emotion contents storage portion 204 so as to instruct the display portion 30 to display the images in time series based on the calling time points (S903). The display portion 30 outputs the images shown in FIG. 10(e) (S904).

When emotions specified from calls are recorded thus in the phone directory as calling party's personal information recorded in the phone directory, how emotions of a person recorded in the phone directory changed due to calls with the portable phone user can be checked easily if the phone directory has been checked.

Figure 11:
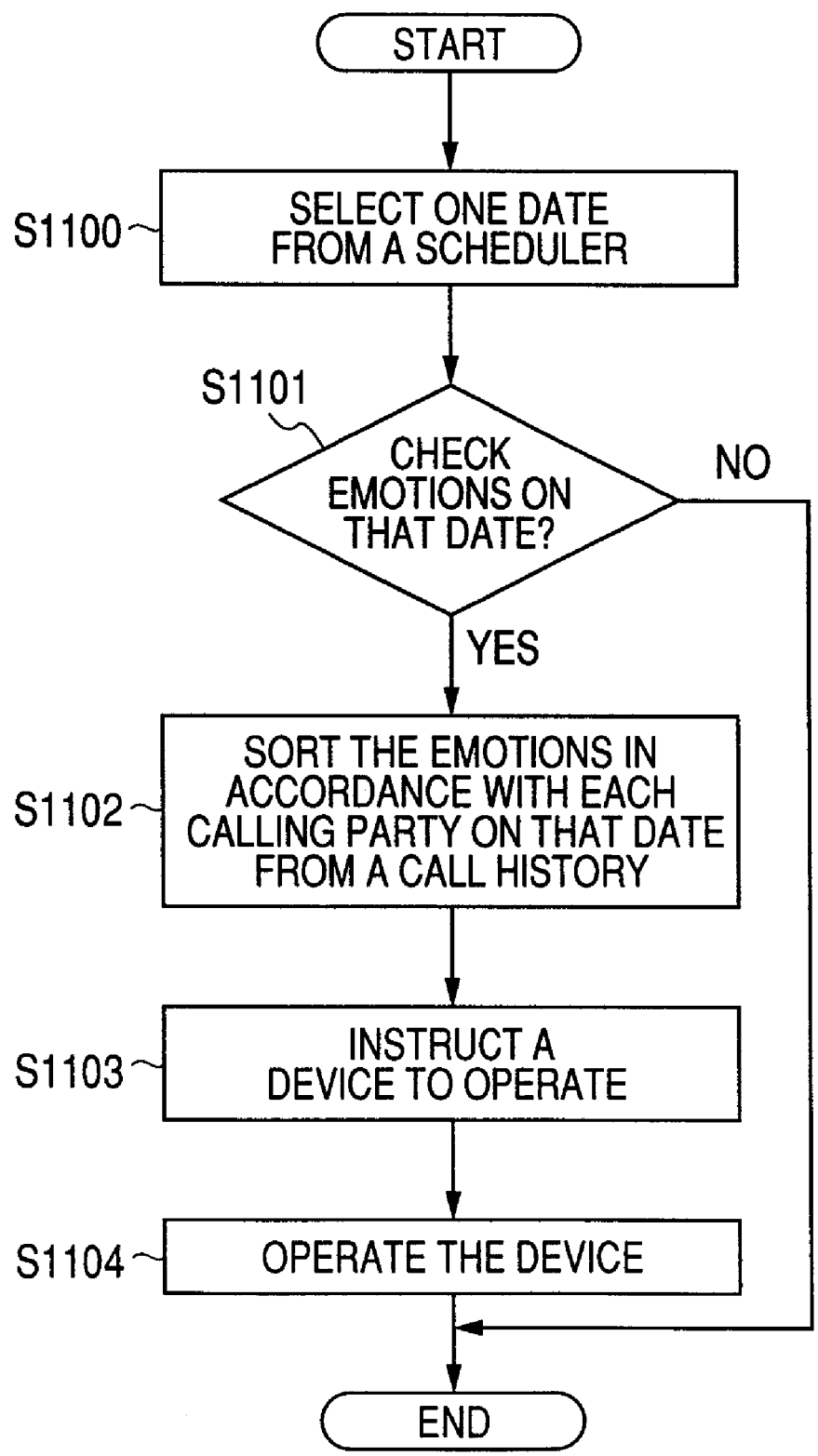
FIG. 11 A flow chart for checking a scheduler in the portable phone according to the first embodiment of the invention.
Figure 12:
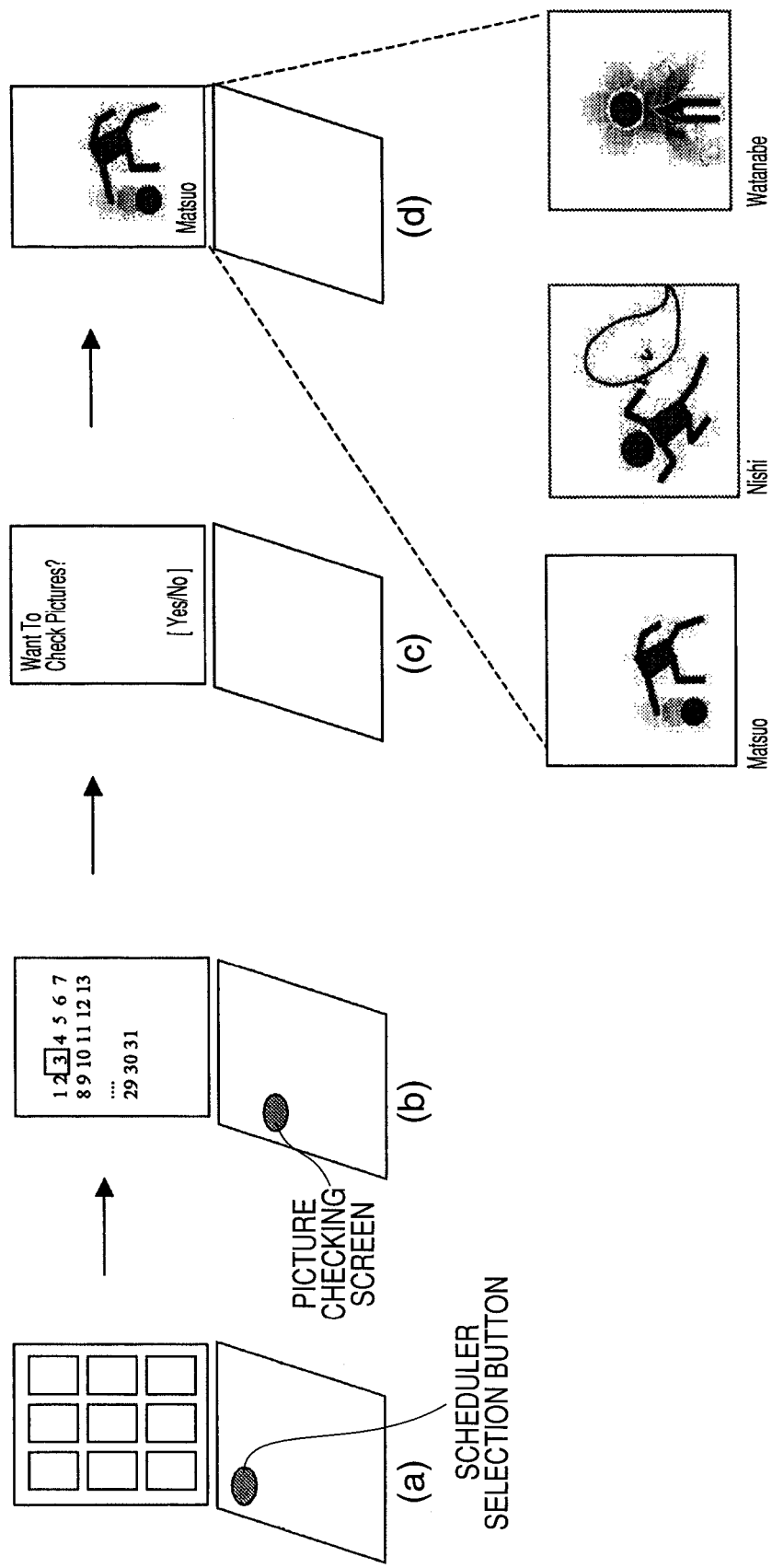
FIG. 12 A display example of the scheduler on the display portion in the portable phone according to the first embodiment of the invention.

The processing flow for checking a scheduler in the portable phone according to the first embodiment of the invention will be described. FIG. 11 shows a flow chart for checking the scheduler in the portable phone according to the first embodiment of the invention. FIG. 12 shows a display example of the scheduler on the display portion in the portable phone according to the first embodiment of the invention.

When the portable phone user pushes a scheduler selection button in FIG. 12(a) so as to display a scheduler on the display portion 30, and then selects one date on a calendar as shown in FIG. 12(b) (S1100) so as to try to check emotions during calls on that date (YES in S1101), the emotion notifying operation instruction portion 205 reads distinctive emotions recorded in the call history 701 on that date (S1102), and reads images corresponding to the distinctive emotions from the emotion contents storage portion 204 so as to instruct the display portion 30 to display these images in accordance with each calling party (S1103). The display portion 30 outputs the images shown in FIG. 12(d) (S1104).

When emotions specified from calls are read out thus in accordance with dates, contents of the calls made on those dates can be reviewed easily.

Although description has been made on the case where each emotion read out by use of the call history, the phone directory or the scheduler is displayed as an image on the display portion and checked in the portable phone according to the first embodiment of the invention, the LED, the vibration, etc. may be operated so as to check the emotion.

Second Embodiment

Figure 13:
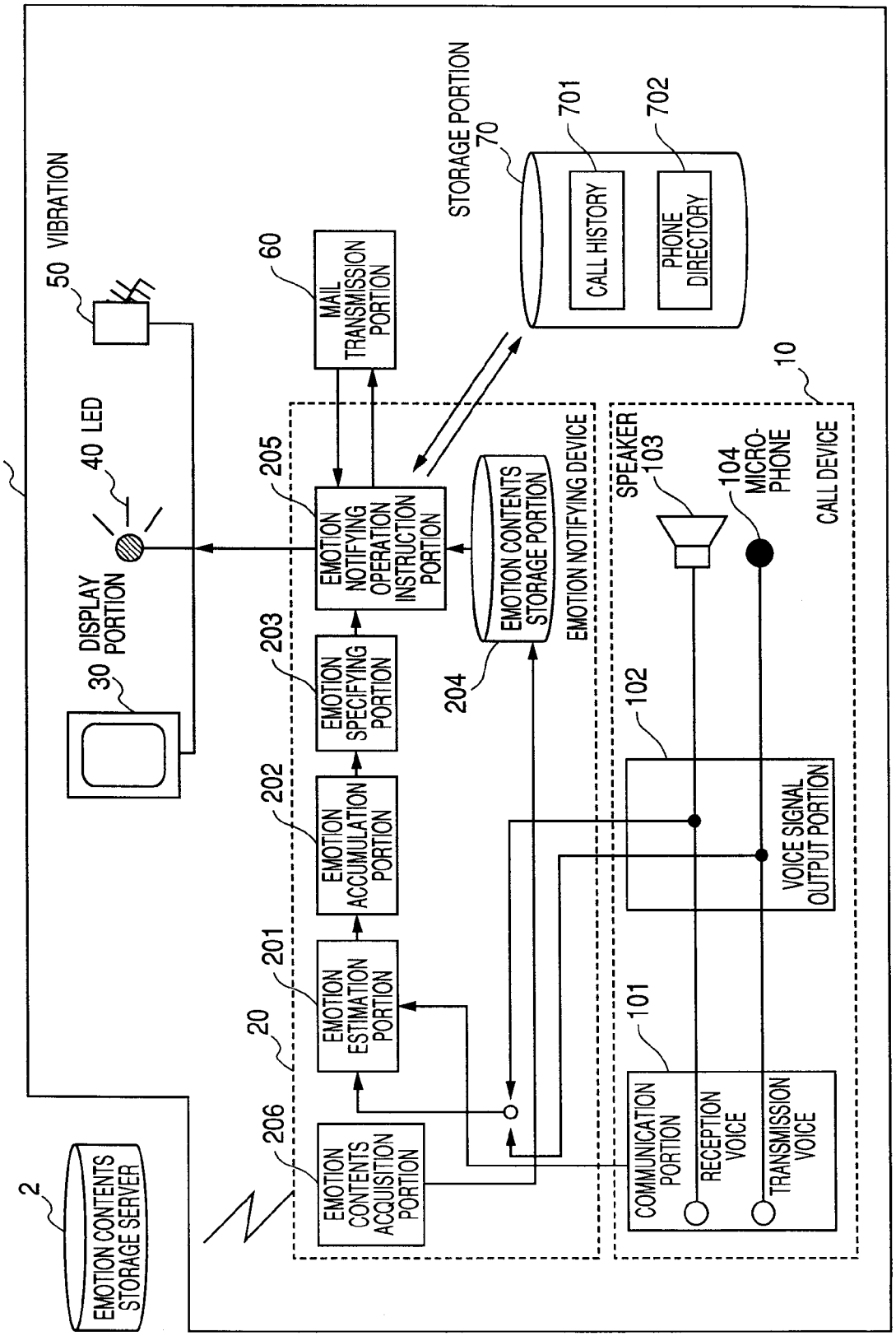
FIG. 13 A diagram of the configuration of a system including a portable phone according to a second embodiment of the invention.

A portable phone according to a second embodiment of the invention will be described in detail with reference to the drawing. FIG. 13 shows a diagram of the configuration of a system including the portable phone according to the second embodiment of the invention. The portable phone according to the second embodiment of the invention includes an emotion contents acquisition portion 206 in addition to the configuration of the portable phone according to the first embodiment. The emotion contents acquisition portion 206 acquires emotion contents from an emotion contents storage server 2 where emotion notifying operations to be performed by devices such as a display portion 30, an LED 40, a vibration 50, etc have been stored. Incidentally, parts with the same reference numerals as those in FIG. 1 have the same configurations for the sake of omission of description.

The emotion contents acquisition portion 206 outputs an emotion notifying operation acquired from the emotion contents storage server 2 to an emotion contents storage portion 204. The emotion contents storage portion 204 newly adds and stores the emotion notifying operation inputted from the emotion contents acquisition portion 206.

When the emotion notifying operation is acquired from the server provided in the outside of the portable phone, a user of the portable phone can easily add a new emotion notifying operation to be performed by the display portion, the LED, the vibration, etc. so that the portable phone user can enjoy the emotion notification for a long term.

Third Embodiment

FIG. 21 is a diagram showing the configuration of a portable phone according to a third embodiment of the invention. Since most of parts in the configuration of the portable phone 11 are the same as the configuration of the portable phone 1 according to the first embodiment, only different parts in the configuration will be chiefly described below.

In an emotion notifying device 20 of the portable phone 11, a voice input switch control portion 200 selectively controls a voice or voices to be inputted to an emotion estimation portion 201. Setting for inputting one or both of a transmission voice and a reception voice is made by an operation of a user of the portable phone on an input operation portion 95. This setting is stored in a control setting storage portion 206. When the voice input switch control portion 200 is notified of the start of a call by a communication portion 101 of a call device 10 receiving an input, the voice input switch control portion 200 selectively outputs each voice signal inputted from the call device 10, based on the aforementioned voice input setting. The outputted voice signal is inputted to the emotion estimation portion 201 in order to estimate talking person's emotions.

An emotion accumulation portion 202 temporarily accumulates the estimated emotions.

When an emotion estimation portion 203 outputs a distinctive emotion based on the accumulated estimated emotions, the distinctive emotion is stored as emotion data 703 in a storage portion 70 while associated with a time point of the distinctive emotion.

An emotion contents storage portion 204 stores output control data 704 and image data 705 for an emotion notifying operation corresponding to the distinctive emotion from the emotion contents storage portion 204 where emotion notifying operations to be performed by devices such as a display portion 30, an LED 40, a vibration 50, etc. have been stored.

When call history data 701 stored in the storage portion 70 are referred to, an emotion notifying operation instruction portion 205 refers to the emotion data 703 and reads the output control data 704 and the image data 705 so as to instruct an output control portion 80 to output the emotion notifying operation to a device.

The output control portion 80 performs operation control on these devices.

As for output of the emotion notifying operation to the devices such as the display portion 30, the LED 40, the vibration 50, etc., one device which is set by the portable phone user via the input operation portion 95 may be controlled to execute the emotion notifying operation or a plurality of devices may be controlled to execute the emotion notifying operation simultaneously. When the operation is executed by a plurality of devices, for example, power of expression of the emotion notification is enhanced so that there brings an effect that the emotion during the call can be transmitted more effectively to the portable phone user. Since the display portion 30 and the LED 40 are devices performing output visually but in different output methods, it is preferable that the LED 40 is located near to the display portion 30. When the display portion 30 and the LED 40 are located near to each other, the display portion 30 and the LED 40 come in sight simultaneously. Accordingly, when the display portion 30 and the LED 40 perform output simultaneously, there is an effect that visual stimulus is larger than that of single output by either of the display portion 30 and the LED 40.

As the output control data 704, there are emission color control data of the display portion 30, blinking pattern control data of the LED 40, vibration pattern control data of the vibration 50, etc. The output control data are not limited thereto. When, for example, there is provided a voice output device as a device, the voice output device can be controlled as long as there contain corresponding voice pattern control data as the output control data.

The image data 705 are stored together with the output control data 704 in the emotion contents storage portion 204. The image data 705 are data particularly for displaying an image on the display portion 30. Image data in a still picture format such as a bit-mapped format, a GIF format, a JPEG format, etc., and image data in a motion picture format such as a Flash format, a Motion JPEG format, etc. are included as the image data 705.

Compositions of these data stored in the storage portion 70 and the emotion contents storage portion 204, association between these aforementioned data, and display of each data in call history display will be described here.

The call history data 701 are made of at least time information such as calling time points or calling times (e.g. counted by a timer portion 208 not shown) and calling/called party-specific number information such as phone numbers etc. The phone directory data 703 are made of at least the calling/called party-specific number information such as phone numbers etc., and calling/called party information such as names, nicknames, etc. associated with the number information. In addition, calling/called party-relevant information (characters, images, voices, etc. associated with the calling/called parties) may be added. In display of a call history, the call history data 701 and the phone directory data are associated with each other by the calling/called party-specific number information such as phone numbers etc., so that the calling time points and the communication party information are displayed. In display of a call history with a calling/called party not included in the phone directory data, the call history data 701 and the phone directory data 703 cannot be associated with each other so that a calling time point and calling/called party-specific number information such as a phone number etc. are displayed.

The emotion data 703 are made of at least calling time points, kinds of input voices (voices of calling/called parties or a voice of user's own) and distinctive emotions. The emotion data 703 may further include identifiable indexes each for identifying data for a time zone in a calling time in a call made at a certain calling time point. The image data 705 are made of at least the distinctive emotions and data of images associated with the distinctive emotions. In display of a call history, the call history data 701, the emotion data 703 and the image data 705 are associated with one another by the calling time points so that at least the calling point times and the data of images associated with the distinctive emotions are displayed.

In the aforementioned description, the emotion data 705 and the phone directory data 703 are also associated with each other so that, for example, the calling time points, the calling/called party information and the distinctive emotions can be displayed together in display of a call history. Information other than the aforementioned information can be displayed in a feasible combination by use of association between these aforementioned data.

When setting for displaying each emotion has been stored in the control setting storage portion 206, the emotion can be displayed as follows after completion of a call or by a call history browsing instruction issued by the portable phone user on the input operation portion 95. The emotion notifying operation control portion 205 associates the call history data 701 with the output control data 704 based on the stored emotion data 703 so as to send an output instruction to the output control portion 80. An output control portion 207 performs emotion display control on a device.

Figure 17:
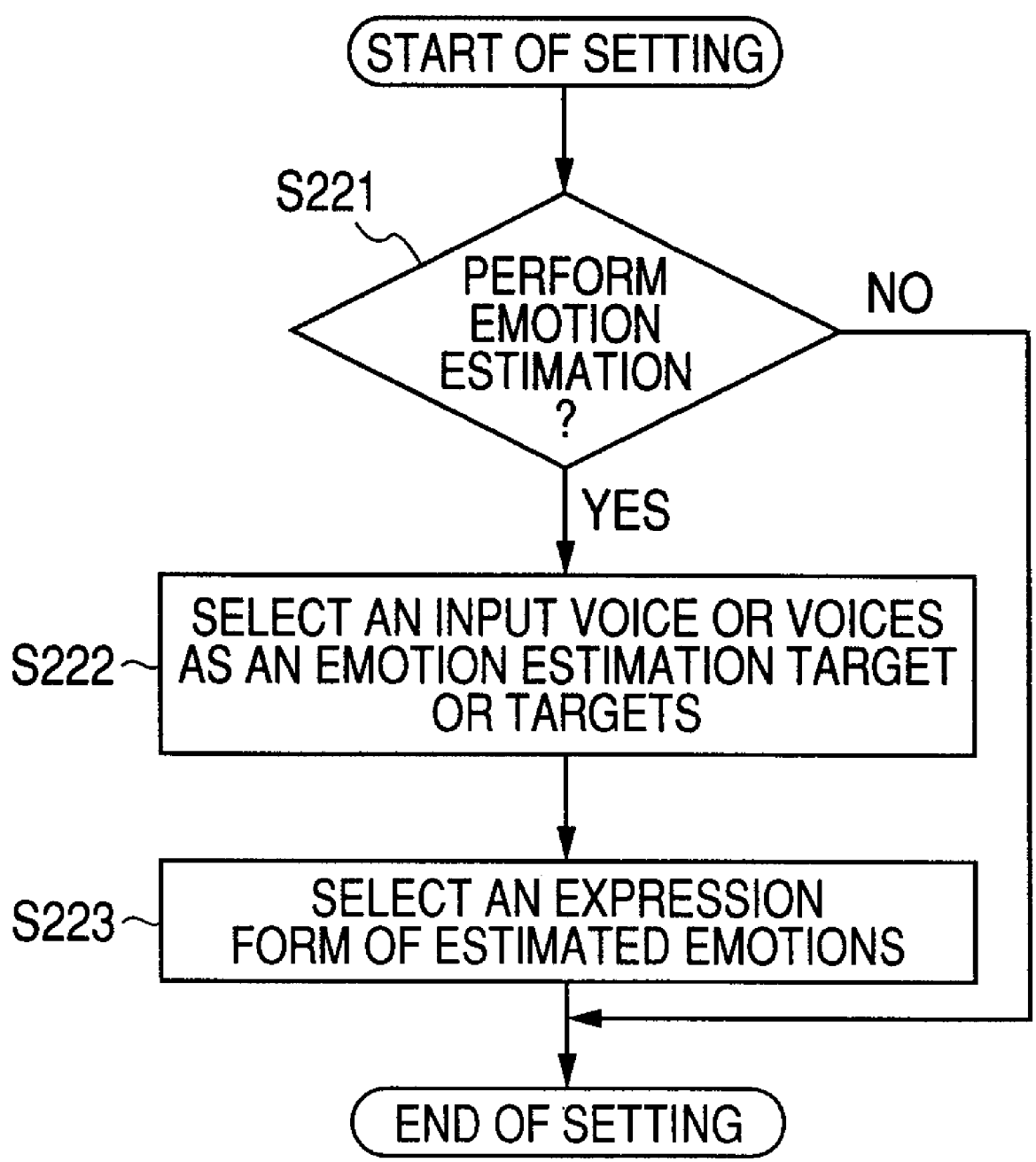
FIG. 17 A flow chart for a portable phone user to perform initial setting about emotion estimation and display of an estimation result in the portable phone in the third embodiment of the invention.

Next, initial setting for emotion estimation and display of an estimation result to be made by the portable phone user will be described with reference to FIG. 17.

The portable phone user performs inputting for emotion estimation by an input operation on the input operation portion 95 (Yes in S171). When emotion estimation is not performed (No in S171), initial setting is terminated. Successively, as for an input voice or voices set as an emotion estimation target or targets, the portable phone user selects one from only input of a transmission voice, only input of a reception voice, input of a mixture of the transmission and reception voices, and respective inputs of the transmission and reception voices (S172). Successively, as for a display form of an emotion estimation result, the portable phone user selects one from display of icon images in time series, display of representative icon images, display of motion pictures as large images and addition of motion pictures as small images (S173). When the aforementioned steps are performed, initial setting is completed.

Figure 18:
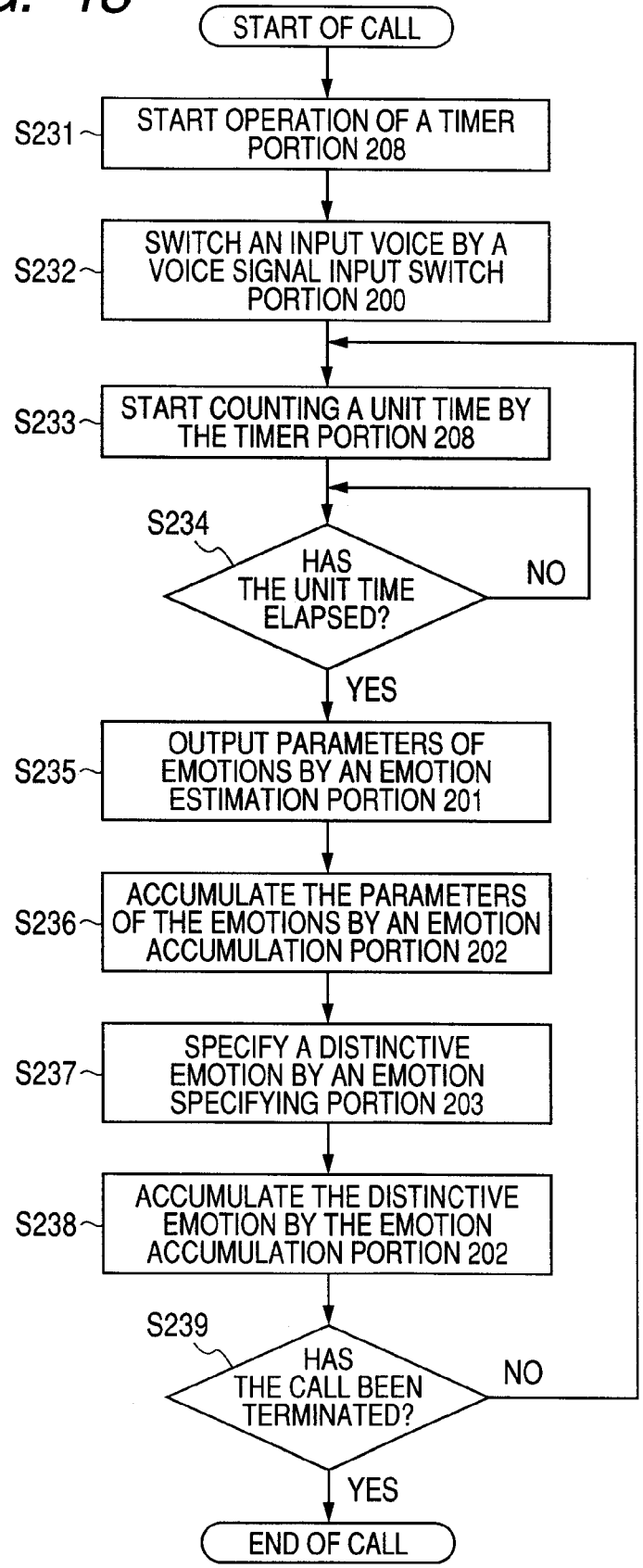
FIG. 18 A flow chart showing an emotion specifying procedure during a telephone call made by the portable phone in the third embodiment of the invention.

Next, a procedure for specifying an emotion during a call will be described with reference to FIG. 18 which is a flow chart.

When a call is started, the timer portion 208 operates (S181). A voice input to the emotion estimation portion 201 is switched by the voice input switch portion 200 (S182). The timer portion 208 starts counting a unit time (S183). After a unit time has elapsed (Yes in S184), the emotion estimation portion 201 outputs emotion parameters of emotions in the unit time (S185). The emotion accumulation portion 202 accumulates the outputted emotion parameters in the unit time (S186). The emotion specifying portion 203 specifies a distinctive emotion in the unit time from the emotion parameters of the unit time (S187). The emotion accumulation portion 202 accumulates the specified distinctive emotion in the unit time (S188). When the call has not been terminated (No in S189), the routine of processing returns to S183 so as to start emotion estimation of the call in a next unit time. When the call has been terminated (Yes in S189), emotion estimation is completed. When emotion specification is performed in this procedure, the emotion parameters and the distinctive emotion are accumulated in the emotion accumulation portion 203 in time series divided by the unit time.

The aforementioned procedure for deciding each emotion will be described below specifically with reference to the drawings.

Figure 20:
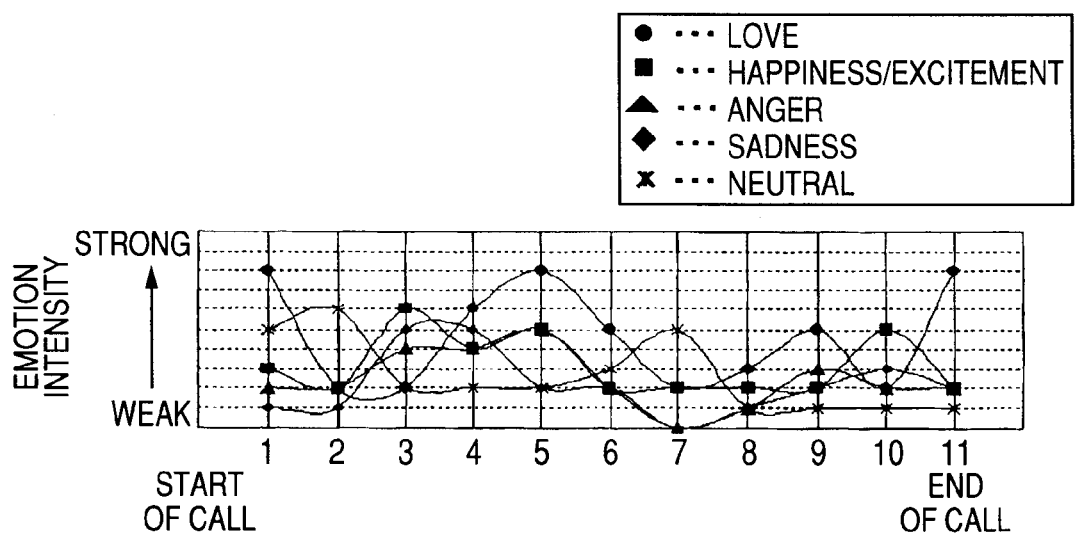
FIG. 20 A graph consecutively showing the intensity of emotion in unit time series in accordance with each kind of emotion outputted by an emotion specifying portion.

FIG. 20 is a graph consecutively showing emotion intensity in accordance with each kind of emotion outputted by the emotion specifying portion 203 in unit time series. In FIG. 25, the horizontal axis designates time and the vertical axis designates intensity of each kind of emotion. The emotion specifying portion 203 does not extract one specified emotion but outputs intensities (indexes each indicating the degree of strong emotion expression) for all kinds of emotions consisting of love, happiness/excitement, anger, sadness and neutral. FIG. 21 is a table obtained by measuring a graph shown in FIG. 20 in numerical terms. Intensity for each emotion kind in each unit time is indicated as a numerical value. When an emotion showing a maximum value is extracted from the emotion kinds in the unit time and the maximum value is not smaller than a predetermined threshold, the emotion is decided as the emotion in the unit time. For example, in a first unit time, intensity of love is 80, intensity of happiness/excitement is 30, intensity of anger is 20, intensity of sadness is 10 and intensity of neutral is 50. Accordingly, an emotion with a maximum value in the first unit time is love. Since intensity of love is 80 which is larger than an intensity threshold of 50, the emotion in the first unit time is decided as love. In addition, in an eighth unit time, intensity of love is 30, intensity of happiness/excitement is 20, intensity of anger is 10, intensity of sadness is 10 and intensity of neutral is 10. Accordingly, an emotion with a maximum value in the eighth unit time is love. However, the intensity of love is 30 which is smaller than the intensity threshold of 50, so that the emotion in the eighth unit time is decided as no judgment. In the lowest portion of FIG. 21, each emotion kind with the maximum value in each unit time designates an emotion kind which was most distinctive in the unit time.

Figure 19:
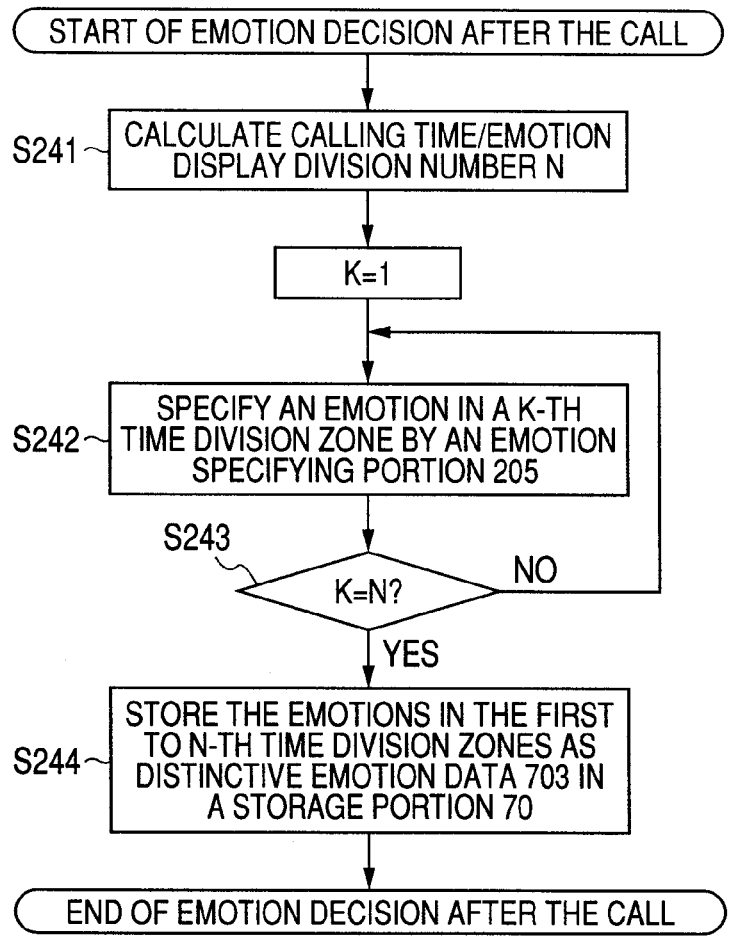
FIG. 19 A flow chart showing an emotion deciding procedure after termination of the telephone call made by the portable phone in the third embodiment of the invention.

Next, a procedure of deciding each emotion after termination of the call will be described with reference to FIG. 19 which is a flow chart.

When the call is terminated, a calling time is divided into sections by a predetermined division number. Here, description will be made on the assumption that the section division number in the calling time is set as N (N is a natural number). The number of unit times per section (one section division zone) is calculated by dividing the calling time by the section division number N and the unit time (S191). Emotion parameters per unit time accumulated in the emotion accumulation portion 203 are grouped to belong to each time division zone. The accumulated values of the emotion parameters per unit time grouped for each time division zone are recalculated in accordance with the emotions in the time division zone so that a distinctive emotion in each time division zone is decided. The estimated emotions of the sections decided in the aforementioned manner are stored in the storage portion 70 while associated with the calling time point.

Here, the aforementioned procedure for deciding each emotion will be described specifically with reference to the drawings. FIG. 22 shows an example in which unit-time emotion parameters shown in FIG. 21 are recalculated while grouped into time-division zones. A number obtained by adding one to an integer number smaller than a number obtained by dividing the calling time by the section division number N and the unit time is set as the number of unit times. In the example of FIG. 21, the number of unit times in the calling time is 11, and the section division number is 4 so that the number of unit times per section is 3. Accordingly, emotion parameters in first to third unit times are grouped into a first section. Similarly, parameters in unit times are grouped into a second section, emotion parameters in seventh to ninth unit times are grouped into a third section. For example, parameters in tenth and eleventh unit times or emotions in ninth to eleventh unit times may be grouped into a fourth unit section. Successively, the values of the emotion parameters in each section are added and accumulated. Decision of an emotion based on the accumulated values of each emotion parameter is performed by a similar method to that for decision of an emotion in a unit time.

When each emotion is decided, an output is performed on a device based on the output control data.

Successively, output of each emotion in a call history will be described. FIG. 23 shows icon examples when the distinctive emotion data 703 stored in the storage portion 70 are illustratively displayed on the display portion 30. In FIG. 23, the left column designates kinds of emotions and the right column designates icons corresponding to the kinds of emotions. Each icon is stored as image data 705 in the emotion contents storage portion 204. When, for example, an emotion of happiness/excitement is changed to an icon expressing the emotion of happiness/excitement and illustratively displayed, the emotion can be recognized intuitively by use of the sense of sight. Although neutral, happiness/excitement, anger, surprise, and sadness are shown as the emotions in FIG. 23 by way of example, other emotions may be associated with icons as long as the emotions can be extracted by the emotion extraction/specification portion. The associated icons are not limited to the illustrated ones but may be other image data stored in the emotion contents storage portion 204.

FIGS. 24 and 25 are views showing examples of emission colors and examples of LED emission (blinking) patterns corresponding to emotion intensities when the distinctive emotion data 703 stored in the storage portion 70 are outputted to the LED 40. In FIG. 24, the left column designates kinds of emotions while the right column designates setting for emission colors corresponding to the kinds of emotions. In FIG. 25, the left column designates emotion intensities while the right column designates setting for ON-OFF time control of the LED. Each LED emission color and each LED emission pattern are stored as output control data 704 in the emotion contents storage portion 204. When, for example, a red LED emission color expressing anger is substituted for an emotion of anger and outputted, the portable phone user can recognize the emotion of anger intuitively from an emotion image given by the red color. In FIG. 24, emotions of neutral, happiness/excitement, anger, surprise and sadness are shown correspondingly to light blue, pink, red, yellow and blue, respectively, by way of example. Other emotions may correspond to LED emission colors as long as these emotions are emotions which can be extracted by the emotion extraction/specification portion 203. The corresponding LED emission colors are not limited to those shown in FIG. 24 but may be LED emission colors of other output control data stored in the emotion contents storage portion 204. When a fact that a certain emotion is strong (e.g. the state of being angry intensely when the emotion is anger) is outputted by high-speed blinking of the LED, the portable phone user can intuitively recognize the fact that the emotion is strong by visual stimulus. When a fact that one emotion is weak (e.g. the state of being angry slightly when the emotion is anger) is outputted by fulltime turning on of the LED, the portable phone user can intuitively recognize the fact that the emotion is weak by visual stimulus. The corresponding LED emission patterns are not limited to those shown in FIG. 25 but may be LED emission patterns of other output control data stored in the emotion contents storage portion 204. The embodiment has been described on the case where the LED 40 outputs an ON/FF state with a binary value. When an LED using a plurality of ternary values or more one of which can be designated to output an ON state is used, emotion intensity can be further outputted in various levels so that power of expression of emotion using the LED emission patterns can be widened. When output of emotion intensity using the emission patterns are use in combination with output of emotions using the emission colors of the LED 40, power of expression of emotions can be widened more so that the portable phone user can recognize the emotions delicately.

[Output Form 1 of Incoming Call History]

A first output form for an incoming call history will be described with reference to the drawing.

Figure 26:
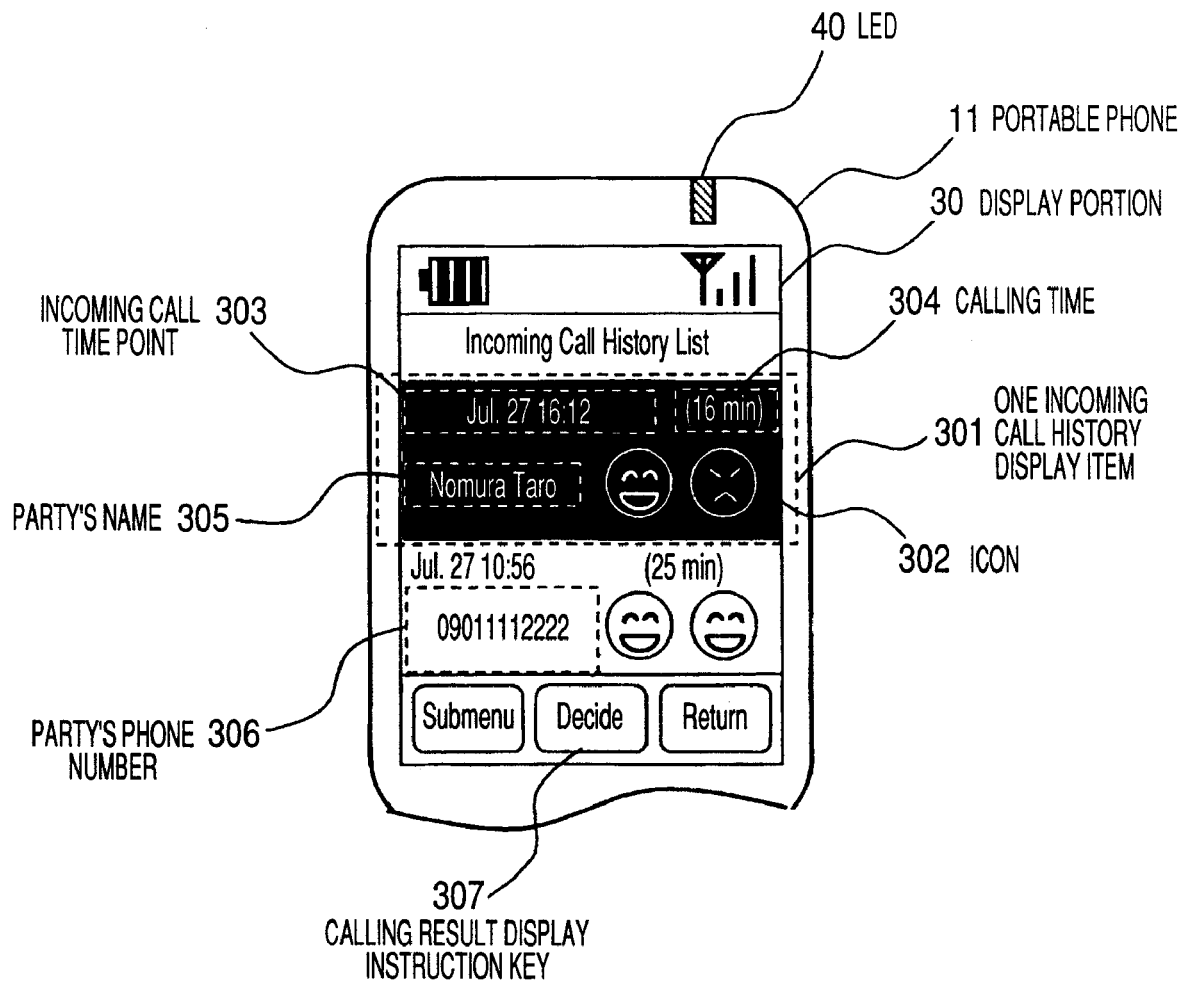
FIG. 26 An example where a list of incoming call histories is displayed on a display portion 30 of the portable phone according to the third embodiment of the invention.

FIG. 26 is an example where a list of incoming call histories is displayed on the display portion 30 of the portable phone 11. One incoming history display item 301 in FIG. 26 is constituted by icons 302 each showing an image corresponding to an emotion extracted from a reception voice (a calling party), an incoming call time point 303, a calling time 304, and a calling party's name 305.

When these displays are used for one incoming call history, two display items can be shown on the screen of the display portion 30 in FIG. 26. When there are three or more incoming call histories accumulated, an operation can be performed on the input operation portion 95 to display another incoming call history. The number of display items per screen may be three or more. The number of display items may be not limited as long as the visibility of the incoming call histories displayed on the screen is not spoiled.

The icons 302 are disposed laterally in time series from the start of a call to the end of the call. When the icons 302 are disposed and displayed in time series, the portable phone user can visually recognize temporal change in the calling party's emotion during the call. The portable phone user can recall contents of the conversation by visual stimulus after the call. When the icons 302 are displayed together with the incoming call time point 303 and the calling party's name 305, there is an effect that the portable phone user can more accurately recall the contents of the conversation, the flow of the conversation, and impression of the party during the conversation.

As the calling party's name 305, a name will displayed as follows. When there is an incoming call, the phone directory data are referred to on the basis of a phone number of the incoming call so that a name recorded in the phone directory data 702 correspondingly to the phone number is displayed as the calling party name 305. When the phone number of the incoming call is not registered, the name is not displayed but the phone number of the incoming call may be displayed directly (see display of the party's phone number 306 in the display portion 33 in FIG. 26) or a message indicating that the phone number is not registered may be displayed.

The icons 302 and the party's name 305 are personal information. For this reason, the portable phone user may want to hide the icons 302 or the party's name 305. On this occasion, the portable phone user as a possessor may perform setting not to display the icons 302 and the party's name 305 for a specific party and remove the setting. As setting not to display the icons 302 and the party's name 305, for example, the icons 302 and the party's name 305 may be displayed as blank spaces, or other images or other character strings may be substituted for the icons 302 and the party's name 305 and displayed. In addition, an incoming call history from a specific party may be displayed in a predetermined character display color, a predetermined background color, etc. When the display is performed thus, the portable phone user can exactly distinguish the incoming call history of the specific party from incoming call histories of the other parties. In addition, the specific party can be set to be unknown to any person other than the portable phone user as a possessor, so that there is an effect that personal information can be prevented from being leaked when the portable phone is lost. Further, setting can be made not to display specific incoming call history display items regardless of calling parties, so that the aforementioned effect can be also obtained.

The incoming call histories may be extracted in accordance with each calling party and displayed on the screen. Further, the extracted histories may be rearranged in order of incoming call time points or lengths of calling times and displayed on the screen. When each incoming call history is extracted in accordance with each calling party and displayed on the screen, when and what the conversion is, in terms of the conservation with a specific party, can be recalled easily. When the incoming call histories are rearranged in order of time points or lengths of calling times and displayed on the screen, the portable phone user can easily extract a desired incoming call history from a large number of incoming call histories.

Although description has been made on output on the display portion 30 in the output form, output using emission of the LED 40 may be performed simultaneously. When output on the display portion 30 and output on the LED 40 are performed together, the portable phone user can recognize the emotion more delicately, compared with the case where output only on the display portion 30 is performed.

[Output Form 2 of Incoming Call History]

A second output form for an incoming call history will be described with reference to the drawings.

In the screen display of incoming call histories in the first output form, a further detailed calling result for any one of the incoming call histories on the screen display can be displayed. In FIG. 26, one incoming call history display item 301 is displayed in a reversal color so as to be distinguished from another incoming call history display item. When an operation is further performed on the input operation portion 95 so as to select a calling result display instruction key 307 from this display state, a calling result is displayed.

Figure 27:
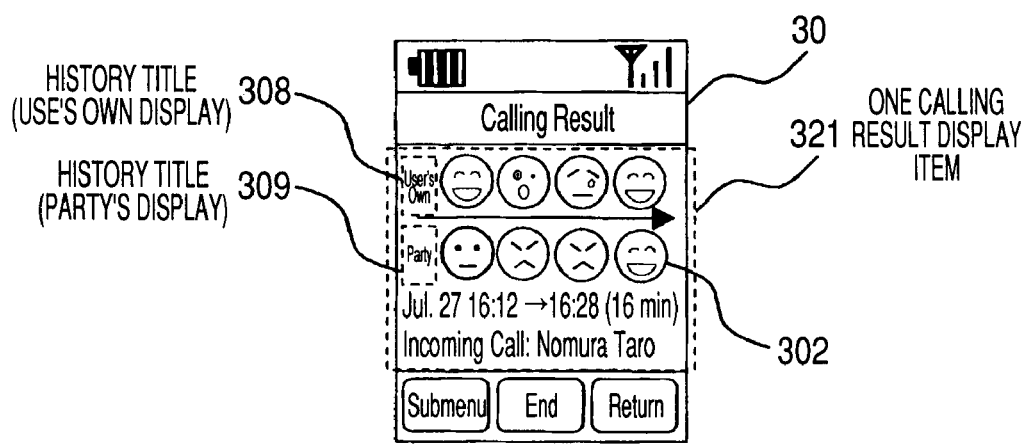
FIG. 27 An example in which a calling result is displayed on the display portion 30 of the portable phone according to the third embodiment of the invention.

FIG. 27 is an example in which the calling result has been displayed on the display portion 30. FIG. 27 is different from the first output form in that emotions extracted from a transmission voice (of user's own) and a reception voice (of the party) are displayed together as icons 302 for the user's own and the party disposed laterally respectively in one calling result display item 321 on the screen in time series, and in that a history title (user's own display) 308 and a history title (the party's display) 309 are displayed on the screen so that the icons 302 for the user's own can be recognized to be distinguished from the icons 302 for the party. In terms of the other screen display, FIG. 27 is the same as the first output form.

In the second output form, change in the user's own emotion is displayed together with temporal change in the calling party's emotion in time series so that the portable phone user can visually recognize temporal changes in the emotions of the party and the user's own during a call from lateral rows of the icons 302, and can visually recognize the emotions at a certain time point in the conversation from a vertical column of the icons 302. Accordingly, there is an effect that contents of the conversation, the flow of the conversation, impression of the party, and the mental state of the user's own at a certain time point can be recalled more accurately.

[Output Form 3 of Incoming Call History]

A third output form for an incoming call history will be described with reference to the drawings.

Figure 28:
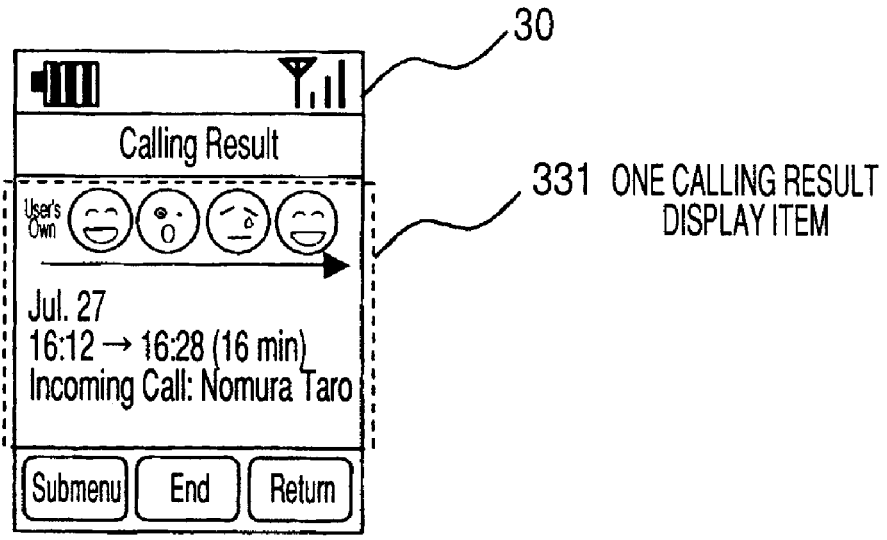
FIG. 28 Another example of the second output form in which a calling result is displayed on the display portion 30 of the portable phone according to the third embodiment of the invention.

FIG. 28 is another example of the second output form in which a calling result is displayed on the display portion 30. FIG. 28 is different from the second output form in that emotions extracted only from a transmission voice (of user's own) are displayed in one calling result display item 331 on the screen, as icons 302 disposed laterally on the screen in time series.

When icons 302 only for the user's own are displayed in time series, particularly temporal change in the user's own emotion during an incoming call can be visually recognized accurately. In addition, contents of the conversation can be recalled visually after the call from the icons 302 disposed in the time series.

Figure 29:
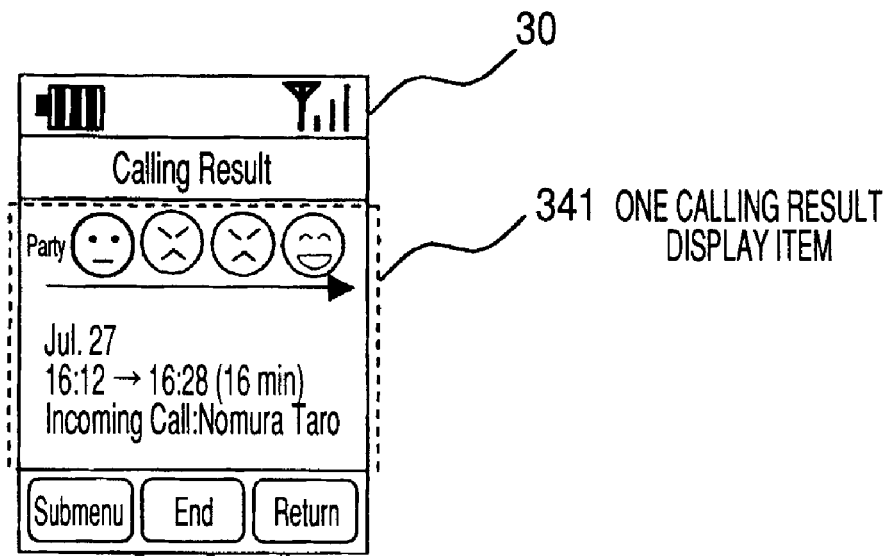
FIG. 29 Another example of the second output form in which a calling result is displayed on the display portion 30 of the portable phone according to the third embodiment of the invention.

FIG. 29 is another example of the second output form in which a calling result is displayed on the display portion 30. FIG. 29 is different from the second output form in that emotions extracted only from a reception voice (the party) are displayed in one calling result display item 341 on the screen, as icons 302 disposed laterally on the screen in time series.

When icons 302 only for the party are displayed on the screen in time series, particularly temporal change in the party's emotion during an incoming call can be visually recognized accurately. In addition, contents of the conversation can be recalled after the call from the icons disposed in the time series.

Display of the calling result only for the user's own and display of the calling result only for the party may be switched to each other. In this manner, there is an effect that each of the displays of the icons 302 in the time series in one incoming call history can be referred to by switching.

[Output Form 4 of Incoming Call History]

A fourth output form for an incoming call display will be described with reference to the drawing.

Figure 30:
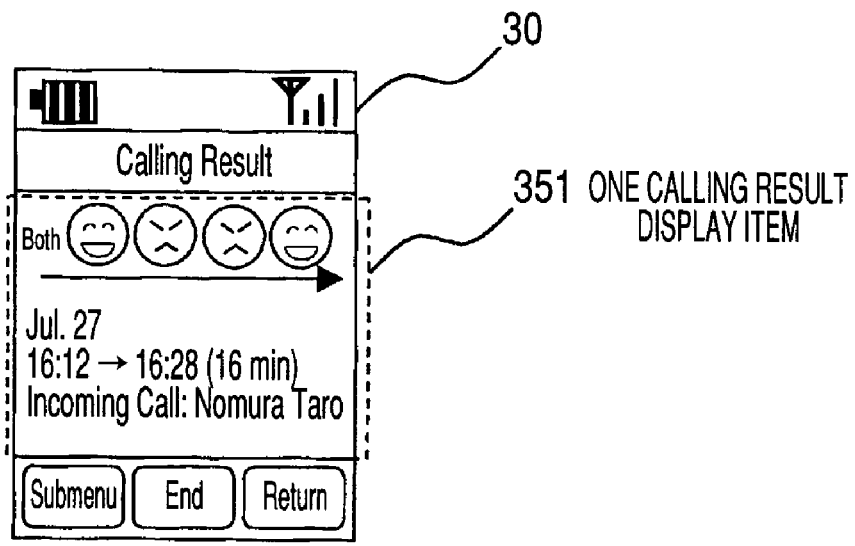
FIG. 30 Another example of the second output form in which a calling result is displayed on the display portion 30 of the portable phone according to the third embodiment of the invention.

FIG. 30 is another example of the second output form in which a calling result is displayed on the display portion 30. FIG. 30 is different from the second output form in that emotions extracted from both a transmission voice (of user's own) and a reception voice (of the party) are displayed in one calling result display item 351 on the screen, as icons 302 disposed laterally on the screen in time series.

When icons 302 for both the user's own and the party are displayed on the screen in time series, temporal change in the emotions as the whole conversation can be visually recognized. In addition, contents of the whole conversation can be recalled after the call from the icons disposed in the time series.

[Output Form 5 of Incoming Call History]

A fifth output form for an incoming call display will be described with reference to the drawing.

Figure 31:
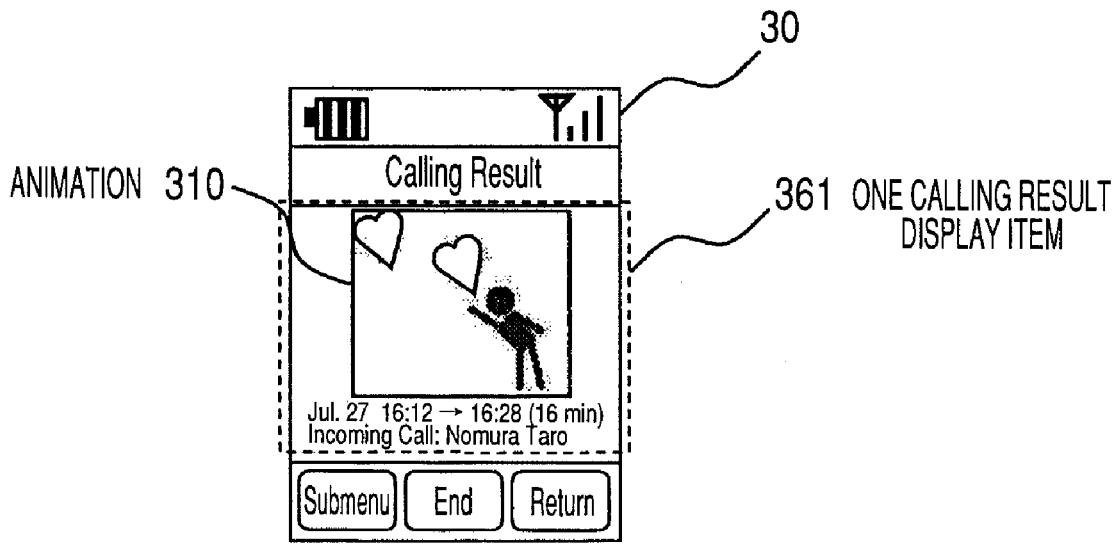
FIG. 31 Another example of the second output form in which a calling result is displayed on the display portion 30 of the portable phone according to the third embodiment of the invention.

FIG. 31 is another example of the second output form in which a calling result is displayed on the display portion 30. FIG. 31 is different from the second output form in that an emotion extracted from a reception voice (the party) is displayed in one calling result display item 361 on the screen, as an animation 310 expressed in motion pictures corresponding to the emotion.

When an emotion of the party as the whole conservation is displayed on the screen as motion pictures, the emotion as the whole conversation can be recognized more visually, compared with the case where the emotion of the party is displayed on the screen by use of a still picture such as an icon. In addition, contents of the conversation can be recalled more accurately after the call by the motion pictures.

Although the description has been made on the case where motion pictures corresponding to an emotion extracted from the whole conversation of the party are displayed in this output form on the screen, motion pictures corresponding to an emotion extracted from the whole conversation of the user's own, or motion pictures corresponding to an emotion extracted from the whole conversation between the user's own and the party may be displayed. The emotion for the whole conservation can be recognized more visually by display of the respective motion pictures than by display using an icon. In addition, contents of the conversation can be recalled more accurately after the call by the motion pictures.

[Output Form 6 of Incoming Call History]

A sixth output form for an incoming call display will be described with reference to the drawings.

Figure 32:
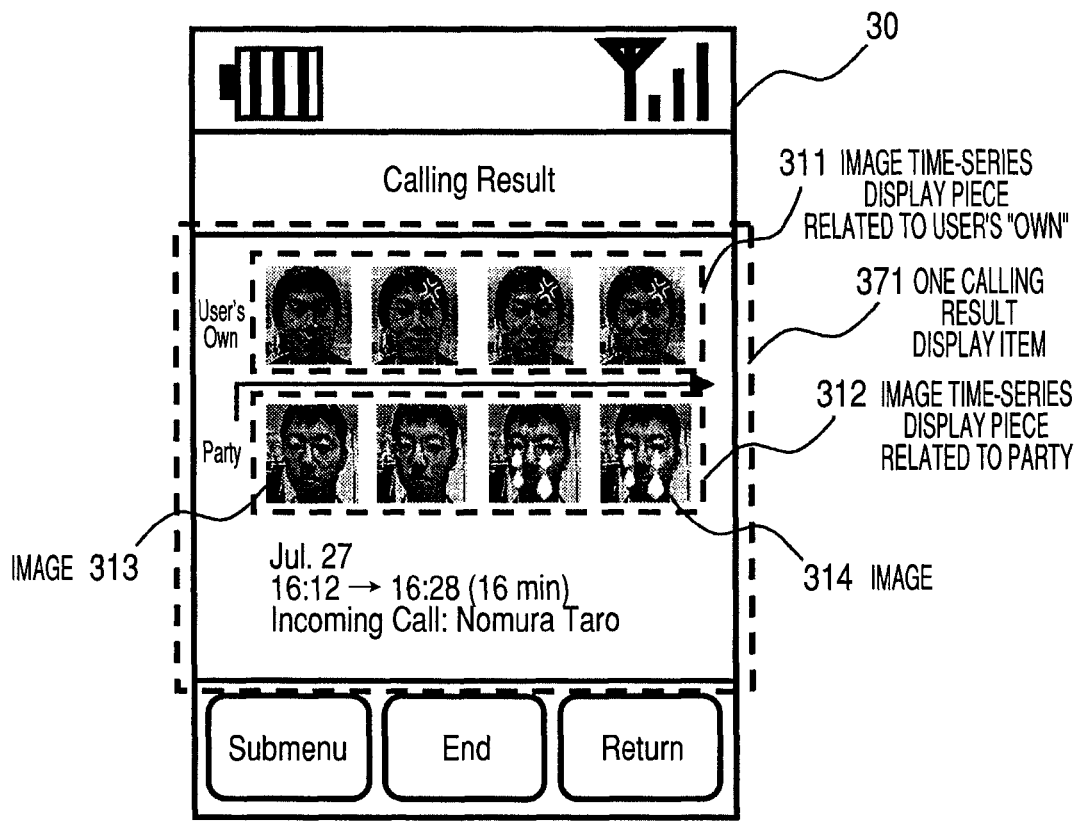
FIG. 32 Another example of the second output form in which a calling result is displayed on the display portion 30 of the portable phone according to the third embodiment of the invention.

FIG. 32 is another example of the second output form in which a calling result is displayed on the display portion 30. This is different from the second output form in that emotions extracted from a transmission voice (of user's own) and a reception voice (of the party) are arranged as an image time-series display piece 311 related to user's own and an image time-series display piece 312 related to the party, respectively, in one calling result display item 371 in place of the icons 302 and displayed on the screen.

Figure 33:
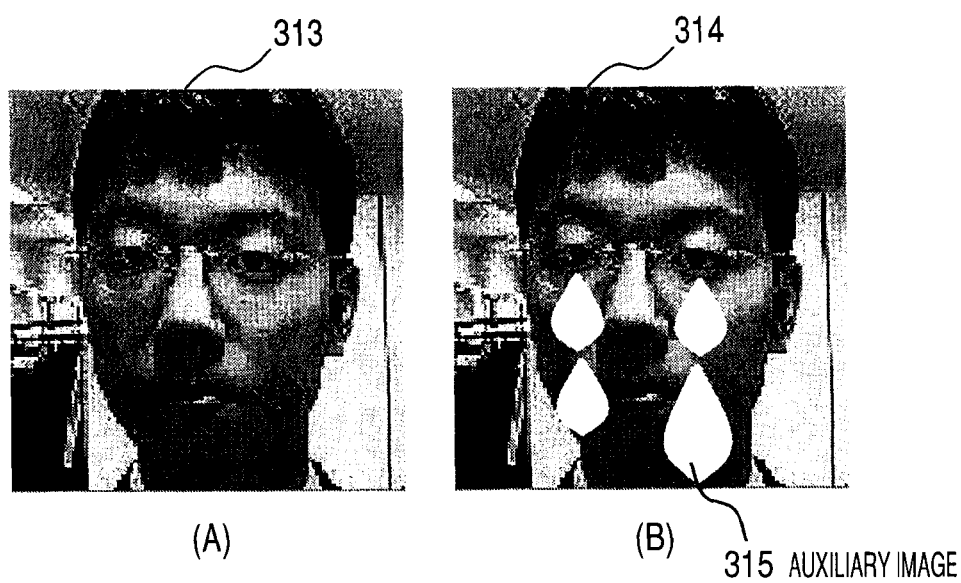
FIG. 33 Images corresponding to a calling party, wherein (A) is an image before image processing and (B) is an image after image processing.

In the image time-series display piece 312 corresponding to the party, different images corresponding to the party are disposed. Specifically, two kinds of images, i.e. images 313 and images 314 are disposed. In this output form, each image corresponding to a calling party "Nomura" in FIG. 33(A) is an image (image 313) when the emotion is neutral. The image 313 is stored in the storage portion 70 and can be also used in the phone directory display of the portable phone 11. No image processing is applied to the image 313. On the other hand, each image corresponding to the calling party "Nomura" in FIG. 33(B) is an image (image 314) when the emotion is sadness. The image 314 is generated by the image processing portion 207 by applying image processing on the image 313. The image processing applied to the image 314 in this output form is superimposition of an auxiliary image 315 expressing tear drops on the image 313. Here, the auxiliary image 315 is an image associated with an emotion of sadness specified by the emotion specifying portion 203. The image 315 is stored in the emotion contents storage portion 204. Accordingly, to display an emotion in this output form, a display image is generated by applying the image processing to the basic image with the auxiliary image, so that individual images corresponding to the user's own and the party for expressing a large number of emotions are not necessarily stored in the storage portion in advance with the result that the storage portion can be used effectively. On the other hand, images to which the image processing is applied may be stored in the storage portion in advance. In this case, it is not necessary to apply the image processing to each of the images when the image is displayed on the screen so that there is an effect that the screen display can be performed at high speed. As the image processing, there is deformation of an image per se corresponding to the party, as well as superimposition of the aforementioned auxiliary image. When the image corresponding to the party is a face image, for example, in order to express an emotion of anger, there are kinds of image processing such as deformation to raise eyebrows and eyes, color tone correction to blush the color of the face, etc. There is not limitation to the kinds of image processing as long as the image processing brings an effect that the image subjected to the image processing reminds the user of the emotion.

When images corresponding to the user's own and the party are arranged as emotion screen display, the portable phone user can use his/her sense of sight to easily recognize the calling party without checking the display of the calling party's name 305. In addition, the portable phone user can distinguish the image time-series display piece 311 corresponding to the user's own from the image time-series display piece 312 corresponding to the party without checking the history titles 308 and 309.

Particularly when face images of the calling party and the user's own are used as images corresponding to the calling party and the user's own, there is an effect that emotions can be recognized more accurately. In addition, when the face images of the user's own and the party performing communication are used, contents of the conversation can be recalled more accurately after the call.

When an image corresponding to a calling party is used in incoming call display in the aforementioned manner, the calling party can be visually identified easily because different images are used for different calling parties. Further, contents of the call can be accurately recalled visually from an incoming call history. It is possible to be more attached to the calling party.

Image display may be only for the user's own, only for the party or for the whole conversation of both the user's own and the party in the same manner as in the third or fourth output form. Effects obtained on this occasion include the aforementioned effects described in the third and fourth output forms in addition to the aforementioned effect in the sixth embodiment.

Fourth Embodiment

A portable phone according to a fourth embodiment of the invention will be described in terms of updating of a phone directory in the portable phone 11 by use of association between the emotion data 705 and the phone directory data 703 after termination of a call.

As for each registered person in the phone directory data 703, when an image corresponding to the registered person has been registered in the storage potion 70, the emotion notifying operation instruction portion 205 instructs the image processing portion 207 to perform image processing on the image corresponding to the registered person, on the basis of the emotion data 703. The image processing is processing of relating an emotion to an original image corresponding to the registered person. As kinds of the image processing, there are image processing for superimposing an auxiliary image stored in the emotion contents storage portion 204 on the image corresponding to the registered person of the phone directory data, image processing for deforming the registered image, etc. in the same manner as in the sixth output form of the third embodiment. There is however not limitation to the kinds of image processing as long as the image processing brings an effect that the image subjected to the image processing reminds the user of the emotion.

The image registered in the phone directory may be updated whenever the image is displayed on the screen, or the image registered in the phone directory may be updated after each call and the updated image data are stored in the storage portion. When updating is performed after each call, image processing is not necessary for display of the phone directory on the screen so that there is an effect that the screen display can be performed at high speed.

As the image corresponding to the registered person in the phone directory, an image stored in advance in the storage portion or an image taken in by an image pickup device, a data communication function, or an external storage medium is used. As kinds of the image, it is preferable to use an image from which the registered person can be remembered easily. For example, a face image of the registered person is preferred.

FIG. 34 shows phone directories with face images of registered persons registered as images corresponding to the registered persons, wherein (A) is screen display of a normal phone directory and (B) is screen display of a phone directory according to this embodiment. FIGS. 34(A) and 34(B) are different from each other in that an image corresponding to each registered person in FIG. 34(B) is displayed on the screen after image processing is applied to the image based on an emotion decided based on a latest call. For example, a registered image corresponding to a registered person "Nomura" in FIG. 34(B) is subjected to image processing corresponding to sadness and displayed on the screen, because an emotion of the registered person during the last call is decided as sadness.

In this manner, an image corresponding to the registered person in the phone directory is subjected to image processing based on an emotion decided based on a latest call, and the resulting image is updated together with the phone number and the registered person's name in the phone directory after the call is made with the registered person in the phone directory. Accordingly, when the portable phone user displays the phone directory on the screen after the call and refers to the phone directory, the registered person in the phone directory and the emotion are visually related to each other so that there is an effect that the memory is stimulated to easily recall contents of the previous call with the registered person in the phone directory. This effect is the same as an effect that contents of the call are recalled by a call history displayed on the screen. In addition, when the portable phone user refers to the phone directory before making a call next time, the portable phone user can recall the contents of the previous call so as to consider contents of a conversation before making the call. Thus, there is an effect that the portable phone user can proceed with the conversation efficiently after making the call, so as to make the conversation smoothly.

Although the invention has been described in detail and with reference to its specific embodiments, it is obvious to those skilled in the art that various changes or modifications can be made without departing from the sprit and scope of the invention.

The present application is based on a Japanese Patent Application (Patent Application No. 2004-264350) filed on Sep. 10, 2004, contents of which are incorporated herein by reference.

INDUSTRIAL APPLICABILITY

The information processing terminal according to the invention can use another expression means to indicate undesirable emotions directly transmitted to a party by a method of directly expressing talking person's emotions in real time, and can bring an effect that the whole image of a calling status can be reviewed afterward and grasped. Thus, the information processing terminal according to the invention is useful as an information processing terminal for giving notice of an emotion of a talking person based on estimation of the emotion from the voice.

The invention claimed is:

1. An information processing terminal, comprising:
   a voice input unit that inputs a voice;
   a parameter generation unit that generates parameters of emotions from the inputted voice;
   a notification unit that gives notice of various kinds of information;
   a storage unit that stores data; and
   a call unit that makes a telephone call,
   wherein the voice input unit inputs voice during a telephone call made by the call unit;
   wherein the storage unit stores the parameters of emotions generated by the parameter generation unit so as to correspond to a sequence in which the parameters of emotions are generated by the parameter generation unit;
   wherein the notification unit gives notice of information regarding emotions corresponding to the parameters stored in the storage unit, in accordance with the sequence;
   wherein the notification unit includes a display unit which displays various kinds of information;
   wherein the storage unit stores the parameters of emotions in accordance with each telephone call made by the call unit; and
   wherein the display unit displays pieces of information, each information indicating an emotion corresponding to a specific parameter among emotions corresponding to the parameters stored in the storage unit, along a time series of the each telephone call.

2. The information processing terminal according to claim 1, wherein the notification unit gives notice of information regarding the emotions after completion of the telephone call made by the call unit.

3. The information processing terminal according to claim 1, further comprising an emotion specifying unit that specifies an emotion expressed by a distinctive one of the generated parameters,
   wherein the notification unit gives notice of information regarding the specified emotion.

4. The information processing terminal according to claim 3,
   wherein the emotion specifying unit specifies an emotion expressed by a distinctive one of the stored parameters.

5. The information processing terminal according to claim 4, wherein the emotion specifying unit specifies an emotion corresponding to a parameter with a highest numeral value, among the parameters of emotions stored in the storage unit.

6. The information processing terminal according to claim 4, wherein the emotion specifying unit specifies an emotion corresponding to a parameter with a highest total of numeral values generated from the start of the voice and the end of the voice, among the parameters of emotions stored in the storage unit.

7. The information processing terminal according to claim 4, wherein the emotion specifying unit specifies an emotion corresponding to a parameter with a highest numeral value generated before the end of the voice, among the parameters of emotions stored in the storage unit.

8. The information processing terminal according to claim 3, further comprising a voice recording unit that records voice during a telephone call made by the call unit,
   wherein the voice input unit inputs voice recorded by the voice recording unit.

9. The information processing terminal according to claim 3, wherein the notification unit includes a display unit which displays various kinds of information;
    wherein the storage unit stores the specified emotion in accordance with each telephone call; and
    wherein when the display unit displays a call history, the display unit displays information regarding the specified emotion together with the call history.

10. The information processing terminal according to claim 9, wherein the storage unit stores a part of voice reflecting the specified emotion; and
    wherein the display unit displays the presence of the part of voice at the same time point as the specified emotion, together with the call history.

11. The information processing terminal according to claim 3, wherein the notification unit includes a display unit which displays various kinds of information;
    wherein the storage unit stores the specified emotion in accordance with each calling/called party; and
    wherein when the display unit displays personal information of the calling/called party stored in the storage unit, the display unit displays information regarding the specified emotion together with the personal information.

12. The information processing terminal according to claim 3, wherein the notification unit includes a display unit which displays various kinds of information;
    wherein the storage unit stores the specified emotion correspondingly to a date for the call; and
    wherein when the display unit displays a calendar, the display unit displays information regarding the specified emotion together with the date of the calendar.

13. The information processing terminal according to claim 3, wherein the notification unit includes a display unit which displays various kinds of information;
    wherein the storage unit stores images corresponding to the emotions; and
    wherein the display unit displays an image read from the storage unit correspondingly to the specified emotion.

14. The information processing terminal according to claim 13, further comprising a reception unit that receives data from a server which records images corresponding to the emotions,
    wherein the storage unit stores the received images corresponding to the emotions.

15. The information processing terminal according to claim 3, wherein the notification unit includes a lighting unit which gives notice of various kinds of information by lighting;
    wherein the storage unit stores colors corresponding to the emotions; and
    wherein the lighting unit lights in a color read from the storage unit, correspondingly to the specified emotion.

16. The information processing terminal according to claim 15, further comprising a reception unit which receives data from a server which records colors corresponding to the emotions,
    wherein the storage unit stores the received colors corresponding to the emotions.

17. The information processing terminal according to claim 3, further comprising a transmission unit that transmits the specified emotion to another information processing terminal.

18. An information processing terminal, comprising:
a voice input unit that inputs a voice;
a parameter generation unit that generates parameters of emotions from the inputted voice;
a notification unit that gives notice of various kinds of information;
a storage unit that stores data; and
a call unit that makes a telephone call;
wherein the voice input unit inputs voice during a telephone call made by the call unit;
wherein the storage unit stores the parameters of emotions generated by the parameter generation unit so as to correspond to a sequence in which the parameters of emotions are generated by the parameter generation unit;
wherein the notification unit gives notice of information regarding emotions corresponding to the parameters stored in the storage unit, in accordance with the sequence;
wherein the notification unit gives notice of information regarding emotions of each of calling/called parties, one of the calling/called parties or both calling and called parties, correspondingly to the parameters stored in the storage unit;
wherein the storage unit stores face image information so as to associate the face image with each person whose face image is photographed; and
wherein the notification unit gives notice of information regarding emotions of each of calling/called parties, one of the calling/called parties or both calling and called parties by applying image processing to the party's face image or images read from the storage unit.

19. An information processing terminal, comprising:
a voice input unit that inputs a voice;
a parameter generation unit that generates parameters of emotions from the inputted voice;
a notification unit that gives notice of various kinds of information;
an emotion specifying unit that specifies an emotion expressed by a distinctive one of the generated parameters;
a storage unit that stores data; and
a call unit that makes a telephone call;
wherein the voice input unit inputs voice during a telephone call made by the call unit;
wherein the storage unit stores the parameters of emotions generated by the parameter generation unit so as to correspond to a sequence in which the parameters of emotions are generated by the parameter generation unit;
wherein the notification unit gives notice of information regarding emotions corresponding to the parameters stored in the storage unit, in accordance with the sequence;
wherein the notification unit gives notice of information regarding the specified emotion;
wherein the notification unit includes a display unit which displays various kinds of information;
wherein the storage unit stores a frequency of appearance of an emotion specified by the emotion specifying unit;
wherein the display unit displays an image read from the storage unit correspondingly to the specified emotion in accordance with the frequency of appearance of the emotion;
wherein the display unit displays an image read from the storage unit correspondingly to the specified emotion; and
wherein the storage unit stores images corresponding to the emotions.

20. An information processing terminal, comprising:
a voice input unit that inputs a voice;
a parameter generation unit that generates parameters of emotions from the inputted voice;

a notification unit that gives notice of various kinds of information;

an emotion specifying unit that specifies an emotion expressed by a distinctive one of the generated parameters;

a storage unit that stores data; and a call unit that makes a telephone call;

wherein the voice input unit inputs voice during a telephone call made by the call unit;

wherein the storage unit stores the parameters of emotions generated by the parameter generation unit so as to correspond to a sequence in which the parameters of emotions are generated by the parameter generation unit;

wherein the notification unit gives notice of information regarding emotions corresponding to the parameters stored in the storage unit, in accordance with the sequence;

wherein the notification unit gives notice of information regarding the specified emotion;

wherein the notification unit includes a vibration unit which gives notice of various kinds of information by vibration;

wherein the storage unit stores vibration frequencies or vibration intensities corresponding to the emotions; and wherein the vibration unit vibrates with a vibration frequency or a vibration intensity read from the storage unit correspondingly to the specified emotion.

21. The information processing terminal according to claim 20, further comprising a reception unit that receives data from a server which records vibration frequencies or vibration intensities corresponding to the emotions, wherein the storage unit stores the received vibration frequencies or vibration intensities corresponding to the emotions.

22. A method of notifying emotion by an information processing terminal, comprising:

inputting voice during a telephone call;

generating parameters of emotions from the inputted voice;

storing the parameters of emotions in a storage unit so as to corresponding to a sequence in which the parameters of emotions are generated; and giving notice of information regarding emotions corresponding to the parameters stored in the storage unit, in accordance with the sequence;

wherein said giving notice of information includes displaying pieces of information, each information indicating an emotion corresponding to a specific parameter among emotions corresponding to the parameters stored in the storage unit, along a time series of the each telephone call.

* * * * *